(12) United States Patent
Nakamichi et al.

(10) Patent No.: US 11,654,666 B2
(45) Date of Patent: May 23, 2023

(54) ANTIFOGGING LAMINATE AND METHOD FOR MANUFACTURING ANTIFOGGING LAMINATE

(71) Applicant: FUJIFILM Corporation, Tokyo (JP)

(72) Inventors: Aki Nakamichi, Minamiashigara (JP); Hiroyuki Yonezawa, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 246 days.

(21) Appl. No.: 17/094,971

(22) Filed: Nov. 11, 2020

(65) Prior Publication Data

US 2021/0060913 A1 Mar. 4, 2021

Related U.S. Application Data

(63) Continuation of application No. PCT/JP2019/022932, filed on Jun. 10, 2019.

(30) Foreign Application Priority Data

Jul. 24, 2018 (JP) .............................. JP2018-138591
Nov. 5, 2018 (JP) .............................. JP2018-208299

(51) Int. Cl.
*B32B 27/30* (2006.01)
*B32B 7/12* (2006.01)
*B32B 23/08* (2006.01)

(52) U.S. Cl.
CPC .............. *B32B 27/306* (2013.01); *B32B 7/12* (2013.01); *B32B 23/08* (2013.01); *B32B 2255/10* (2013.01); *B32B 2255/26* (2013.01); *B32B 2264/1021* (2020.08); *B32B 2264/1023* (2020.08); *B32B 2305/72* (2013.01); *B32B 2307/728* (2013.01)

(58) Field of Classification Search
None
See application file for complete search history.

(56) References Cited

U.S. PATENT DOCUMENTS 4,478,909 A * 10/1984 Taniguchi ........ B29D 11/00865
                                                          428/428
5,134,021 A *  7/1992 Hosono ................... C03C 17/34
                                                          428/428
5,804,612 A *  9/1998 Song ........................ C08J 7/046
                                                          523/169

(Continued)

FOREIGN PATENT DOCUMENTS

JP          2-018048 A      1/1990
JP          9-151368 A      6/1997

(Continued)

OTHER PUBLICATIONS

Hirose—JP 2014-205736 A—MT—antifogging film w-oxide particles—aspect ratio—2014 (Year: 2014).*

(Continued)

*Primary Examiner* — John Vincent Lawler
(74) *Attorney, Agent, or Firm* — Sughrue Mion, PLLC

(57) ABSTRACT

An antifogging laminate includes a coating layer on a water absorbent film, in which a water absorption rate of the water absorbent film is 1% or more and 50% or less, and the coating layer contains a water absorbent resin and inorganic oxide particles.

16 Claims, 1 Drawing Sheet

(56) References Cited

U.S. PATENT DOCUMENTS

| | | | | |
|---|---|---|---|---|
| 2010/0245221 A1* | 9/2010 | Khan | .................. | G02F 1/13476 345/87 |
| 2014/0168771 A1* | 6/2014 | Zhou | .................... | G02B 5/3083 264/2.6 |
| 2019/0202184 A1 | 7/2019 | Hanawa et al. | | |

FOREIGN PATENT DOCUMENTS

| | | | | |
|---|---|---|---|---|
| JP | 11-010783 A | 1/1999 | | |
| JP | 11-240112 A | 9/1999 | | |
| JP | 4013242 B2 | 11/2007 | | |
| JP | 2013-099879 A | 5/2013 | | |
| JP | 2013-107255 A | 6/2013 | | |
| JP | 2014/205736 | * 10/2014 | ............. | B32B 17/06 |
| JP | 2014-224213 A | 12/2014 | | |
| JP | 2018-002865 A | 1/2018 | | |
| WO | 2015083479 A1 | 6/2015 | | |
| WO | 2015093168 A1 | 6/2015 | | |
| WO | WO-2015083479 A1 * | 6/2015 | ............. | B32B 17/06 |
| WO | 2018038270 A1 | 3/2018 | | |
| WO | WO-2018038270 A1 * | 3/2018 | ............... | B05D 5/00 |

OTHER PUBLICATIONS

Bekku—WO 2015-083479 A1—ISR D1—Original—heat-shielding antifog film—2015 (Year: 2015).*
Hanawa—WO 2018-038270 A1—sister of IDS—Original—anti-fogging laminate—cross-linked resin—Mar. 2018 (Year: 2018).*
Office Action dated Mar. 24, 2022 issued by the Chinese Patent Office in Chinese Application No. 201980030472.2.
International Search Report dated Aug. 27, 2019 from the International Searching Authority in International Application No. PCT/JP2019/022932.
Written Opinion dated Aug. 27, 2019 from the International Bureau in International Application No. PCT/JP2019/022932.
International Preliminary Report on Patentability dated Jan. 26, 2021 from the International Bureau in International Application No. PCT/JP2019/022932.
Notice of Reasons for Refusal dated Dec. 21, 2021 from the Japanese Patent Office in Japanese Application No. 2020-532202.

* cited by examiner

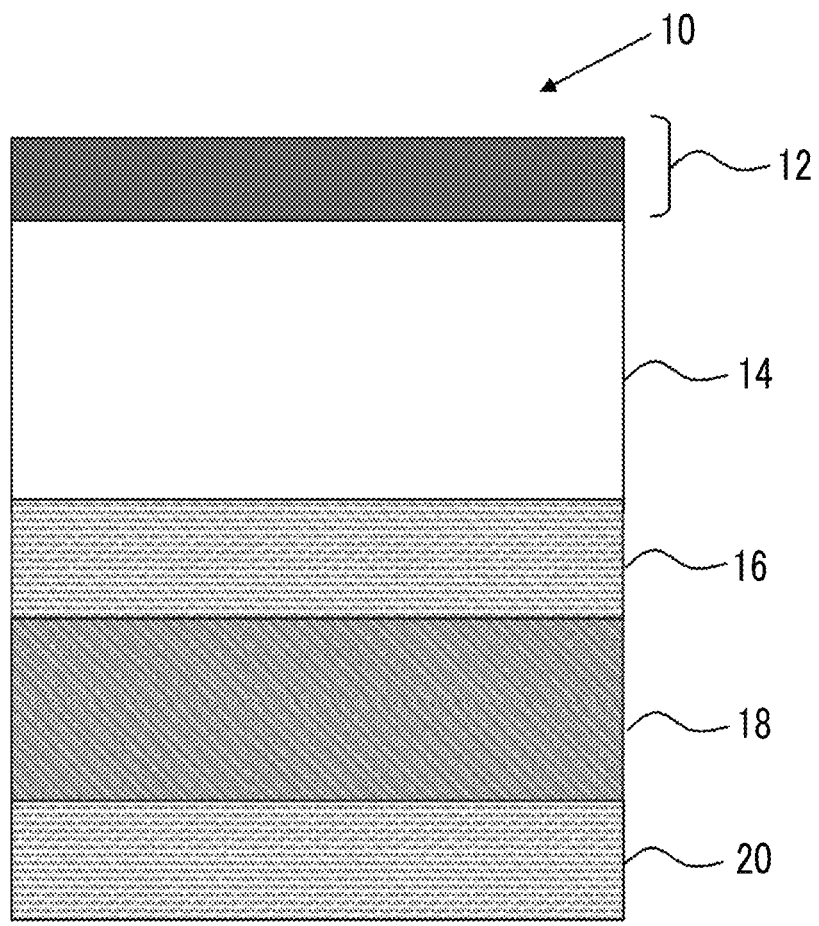

ANTIFOGGING LAMINATE AND METHOD FOR MANUFACTURING ANTIFOGGING LAMINATE

CROSS-REFERENCE TO RELATED APPLICATIONS

This application is a Continuation of PCT International Application No. PCT/JP2019/022932 filed on Jun. 10, 2019, which claims priority under 35 U.S.C § 119(a) to Japanese Patent Application No. 2018-138591 filed on Jul. 24, 2018, and Japanese Patent Application No. 2018-208299 filed on Nov. 5, 2018. Each of the above application(s) is hereby expressly incorporated by reference, in its entirety, into the present application.

BACKGROUND OF THE INVENTION

1. Field of the Invention

The present disclosure relates to an antifogging laminate and a method for manufacturing an antifogging laminate.

2. Description of the Related Art

Devices, building materials, and the like that are installed indoors and outdoors and used for a long period of time are easily exposed to various environments, and an expected function and performance may not be maintained due to, for example, facts that water droplets may be attached due to the influence of temperature, or it may get wet with rainwater during wind and rain. As a technique for solving such a situation, for example, a technique for making surface properties hydrophilic has been studied.

As the technique for making surface properties hydrophilic, a method of providing a hydrophilic layer on a target surface is known. Specifically, a material that makes a surface hydrophilic (hydrophilic type material), and a material that imparts water absorption properties to the surface (water absorption type material) has been widely studied. Among them, the hydrophilic material takes advantage of the superhydrophilicity of the material, and for example, by forming a water film instead of water droplets on surface of a transparent base material, it is possible to impart properties (antifogging properties) such that a transmission image is not blurred. Furthermore, the water absorption type material can store water inside the material, and thereby can provide antifogging properties.

As a technique related to the above techniques, an antifogging agent composition containing silica particles, a condensate of tetraethylalkoxysilane, a vinyl monomer having an N-methylol group or an N-alkoxymethylol group, a vinyl monomer having hydrophilic groups (sulfonic acid, carboxylic acid, phosphoric acid), and a hydrophilic copolymer containing a (meth)acrylate monomer; and a water absorbent antifogging layer formed of the same have been proposed (for example, refer to JP2018-002865A).

Furthermore, it is disclosed that both hydrophilicity and adhesiveness to a base material are compatible by providing a film containing a specific hydrophilic material and a resin material, and by providing a composition gradient film in which a composition of the hydrophilic material and the resin material continuously changes so as to have a specific ratio in the film (for example, refer to JP2013-107255A).

Furthermore, it is disclosed that two layers of a coating liquid obtained by adding a silane hydrolyzate and the like to polyvinyl alcohol are coated, and after it is cured by heating, it is immersed in hot water, and thereby a swelling-treated antifogging coating film is obtained (for example, refer to JP1990-018048A (JP-H02-018048A)).

As a technique related to the above technique, a hydrophilic material having both antifogging properties and scratch resistance by including a first coating film containing a water absorbent organic polymer on a base material, and a second coating film containing a hydrophilic inorganic oxide and a carboxylic acid-containing compound on the first coating film is disclosed (for example, refer to JP4013242B).

Furthermore, a technique in which antifogging properties are improved while still maintaining scratch resistance by providing a water absorbing layer and a hydrophilic layer on a base material in this order, using the hydrophilic layer is made of a crosslinked resin having a hydrophilic group, and allowing hydrophilic group strength in the hydrophilic layer to be inclined in a depth direction is disclosed (for example, refer to WO2018/038270A1).

SUMMARY OF THE INVENTION

Among the above techniques, in a case of the hydrophilic material, in a case where an amount of adhered water is increased and exceeds a certain amount, there is a problem that a thickness of the water film is large and droplet drips. Furthermore, a thick water film formed on a surface of a transparent base material causes fluctuations in a transmission image seen through the transparent base material, and there is a problem of not only blurring of the transmission image, but also transparency being impaired. Accordingly, use of hydrophilic materials has been limited.

Furthermore, in the case of a water absorbent type material, a material that swells due to water absorption cannot increase a degree of crosslinking, and therefore the material itself has poor mechanical strength. Accordingly, there is a problem that it cannot be applied to usage applications where physical contact often occurs.

As a technique capable of ameliorating the problems in the hydrophilic type and water absorbent type materials, a laminate structure having a hydrophilic type upper layer on a water absorbing type lower layer has been studied.

The above laminate structure is based on the findings that it is possible to maintain antifogging properties (antifogging laminate having transparency and less fluctuation in a transmission image derived from a water film) for a long period of time without impairing scratch resistance.

In the invention described in JP4013242B, since the upper layer is composed only of silica particles and a carboxylic acid-containing compound, a sufficient amount of water absorption cannot be ensured, and there was a problem that fluctuation of a water film occurs in a case where water of a water absorption capacity or more is adhered. Furthermore, in the invention described in WO2018/038270A1, since the degree of crosslinking of the hydrophilic layer is not sufficient, the antifogging layer itself swells due to water absorption and dissolution occurs, traces of water dripping remain at the dissolved portion, and there was a problem of a deterioration in uniformity, appearance, and the like. The situation is that a technique capable of more effectively ameliorating the problems in hydrophilic type and water absorbent type materials has not been established.

The present disclosure has been made in view of the above problems. That is, an object to be achieved by the embodiment of the present invention is to provide an antifogging laminate which can maintain antifogging properties for a long period of time, has excellent scratch resistance, and in which dried marks (dripping marks on a surface after drying) are unlikely to be generated on the surface.

Another object to be achieved by the embodiment of the present invention is to provide a method for manufacturing an antifogging laminate which enables manufacture of an antifogging laminate which can maintain antifogging properties for a long period of time, has excellent scratch resistance, and in which dried marks are unlikely to be generated on a surface thereof is provided.

The present disclosure is based on findings that by providing a coating layer on a water absorbent film and by incorporating a water absorbent resin and inorganic oxide particles in the coating layer, it is possible to maintain antifogging properties (antifogging laminate having transparency and less fluctuation in a transmission image derived from a water film) for a long period of time without impairing scratch resistance, and it is possible to ameliorate dripping marks on a dried surface.

The term "dried marks" refers to marks (dripping marks) that remain on a dried surface that has been wet with water. It is thought that generation of the dripping marks appears, for example, in a case where a low molecular component in a water absorbent resin is eluted and remains as spots on a dried surface during drying.

Specific means for achieving the objects include the following aspects.

<1> An antifogging laminate comprising: a water absorbent film, and a coating layer on the water absorbent film, in which the coating layer contains a water absorbent resin and inorganic oxide particles, and a water absorption rate of the water absorbent film is 1% or more and 50% or less.

<2> The antifogging laminate according to <1>, in which the water absorbent film contains at least one resin selected from the group consisting of a cellulose-based resin, a polyvinyl alcohol-based resin, a polyvinyl acetal-based resin, a polyvinylpyrrolidone-based resin, a polyvinyl acetate-based resin, a polyvinyl acetamide-based resin, and a polyacrylamide-based resin.

<3> The antifogging laminate according to <1> or <2>, in which the water absorbent film contains a cellulose-based resin or a polyvinyl alcohol-based resin.

<4> The antifogging laminate according to any one of <1> to <3>, in which the water absorbent film is a triacetyl cellulose film.

<5> The antifogging laminate according to any one of <1> to <4>, in which the water absorbent film is a triacetyl cellulose film subjected to a hydrophilization treatment.

<6> The antifogging laminate according to any one of <1> to <5>, in which the inorganic oxide particles are silica particles or alumina particles.

<7> The antifogging laminate according to any one of <1> to <6>, in which the inorganic oxide particles are alumina particles having an aspect ratio of 5 to 5,000.

<8> The antifogging laminate according to any one of <1> to <7>, in which the water absorbent resin is a polyvinyl alcohol-based resin.

<9> The antifogging laminate according to any one of <1> to <8>, in which a thickness of the coating layer is 1 to 10 μm.

<10> The antifogging laminate according to any one of <1> to <9>, further comprising a support layer on a water absorbent film side opposite to a water absorbent film side having the coating layer.

<11> The antifogging laminate according to any one of <1> to <10>, further comprising a pressure sensitive adhesive layer on a water absorbent film side opposite to a water absorbent film side having the coating layer.

<12> The antifogging laminate according to <10>, further comprising a pressure sensitive adhesive layer on a support layer side opposite to a support layer side having the water absorbent film.

<13> A method for manufacturing an antifogging laminate, the method comprising: applying a coating liquid containing a water absorbent resin and inorganic oxide particles onto a water absorbent film and drying the coating liquid.

<14> The method for manufacturing an antifogging laminate according to <13>, in which the inorganic oxide particles are silica particles or alumina particles.

<15> The method for manufacturing an antifogging laminate according to <13> or <14>, in which the inorganic oxide particles are alumina particles having an aspect ratio of 5 to 5,000.

<16> The method for manufacturing an antifogging laminate according to any one of <13> to <15>, in which the water absorbent resin is a polyvinyl alcohol-based resin.

<17> The method for manufacturing an antifogging laminate according to any one of <13> to <16>, in which the coating liquid contains a crosslinking agent.

<18> The method for manufacturing an antifogging laminate according to any one of <13> to <17>, in which the coating liquid contains a curing catalyst.

According to one embodiment of the present invention, an antifogging laminate, which can maintain antifogging properties for a long period of time, has excellent scratch resistance, and in which dried marks are unlikely to be generated on a surface thereof, is provided. According to another embodiment of the present invention, a method for manufacturing an antifogging laminate which enables manufacture of an antifogging laminate which can maintain antifogging properties for a long period of time, has excellent scratch resistance, and in which dried marks are unlikely to be generated on a surface thereof is provided.

BRIEF DESCRIPTION OF THE DRAWINGS

FIG. 1 is a cross-sectional view showing an example of a laminate structure of an antifogging laminate of an aspect in which a coating layer is provided on a water absorbent film.

DESCRIPTION OF THE PREFERRED EMBODIMENTS

Hereinafter, an antifogging laminate of the present disclosure and a method for manufacturing the same will be described in detail.

In the present specification, the term "step" includes not only an independent step, and but also a step that cannot be distinguished clearly from other steps as long as the intended purpose of the step is achieved.

In the present specification, a numerical value range shown using "to" indicates a range including numerical values described before and after "to" as a minimum value and a maximum value, respectively. In a numerical value range described stepwise in the present specification, an upper limit value or a lower limit value described in a certain numerical value range may be replaced with an upper limit value or a lower limit value of another numerical value range described stepwise. In addition, in a numerical value range described in the present disclosure, an upper limit value or a lower limit value described in a certain numerical value range may be replaced with values shown in Examples.

Furthermore, in the present specification, an amount of each component in a composition means a total amount of a plurality of substances present in the composition unless otherwise specified in a case where the plurality of substances corresponding to each component are present in the composition. The term "solid content" in the present disclosure means components excluding solvents, and a "solid content" in the present disclosure also includes a liquid component such as a low molecular weight component other than solvents. Furthermore, in the present specification, a "coating liquid" used for forming a coating layer may be appropriately referred to as an "application liquid for forming a coating layer," an "application liquid," or a "coating agent."

<Antifogging Laminate>

An antifogging laminate of the present disclosure includes a water absorbent film, and a coating layer that is disposed on the water absorbent film and that contains inorganic oxide particles and a water absorbent resin. In addition to the water absorbent film and the coating layer, the antifogging laminate of the present disclosure may include a pressure sensitive adhesive layer on a water absorbent film side opposite to a water absorbent film side having the coating layer, or may include a pressure sensitive adhesive layer on a surface of the water absorbent film opposite to a surface of the water absorbent film having the coating layer.

The antifogging laminate of the present disclosure may include a support on a pressure sensitive adhesive layer side opposite to a pressure sensitive adhesive layer side having the water absorbent film, and the antifogging laminate of the present disclosure may further include another layer such as a pressure sensitive adhesive layer on a support side opposite to a support side having the pressure sensitive adhesive layer. As the support, a non-water absorbent support is preferable.

The present disclosure focuses on a structure in order to ameliorate a problem of an antifogging performance. Specifically, the coating layer containing inorganic oxide particles and a water absorbent resin is provided on the water absorbent film. Accordingly, it is possible to maintain antifogging properties for a long period of time while still realizing a structure in which mechanical strength, which is an issue of absorptive materials, is not impaired, and to obtain a property in which dried marks are unlikely to be generated on a surface even after the antifogging laminate is wet with water.

A specific aspect of the antifogging laminate of the present disclosure will be described with reference to FIG. 1. An antifogging laminate 10 shown in FIG. 1 has a structure including a water absorbent film 14 on a non-water absorbent support 18 with a pressure sensitive adhesive layer 16 therebetween, and a pressure sensitive adhesive layer 20 disposed on a water absorbent film 14 side opposite to a side having a coating layer 12.

(Water Absorbent Film)

The water absorbent film is not particularly limited as long as it is a formed product that contains at least a resin and is water absorbent.

The term "water absorbent" in the present disclosure refers to a property in which a water absorption rate measured according to Japanese Industrial Standards (JIS) K 7209:2000 (A method) is equal to or more than 1%. Accordingly, the water absorbent film in the present disclosure refers to a film in which a water absorption rate is equal to or more than 1%, and a film as a non-water absorbent film, in which a water absorption rate is less than 1%, is distinguished from the water absorbent film in the present disclosure.

A water absorption rate is preferably equal to or more than 3% and is more preferably equal to or more than 5% in order to ensure long-term antifogging properties depending on an amount of water absorption. In addition, an upper limit of the water absorption rate is preferably equal to or less than 50%, more preferably equal to or less than 30%, and even more preferably equal to or less than 20%, from the viewpoint of reducing changes in film thickness due to swelling.

A water absorption rate of the water absorbent film in the present disclosure is equal to or more than 1% and equal to or less than 50%, preferably equal to or more than 1% and equal to or less than 30%, even more preferably equal to or more than 5% and equal to or less than 20%, and most preferably equal to or more than 10% and equal to or less than 20%.

The water absorbent film may be any of a formed product of a water absorbent resin, or a laminate of a formed product of a water absorbent resin and a surface-treated absorptive layer.

(1) Examples of formed products of a water absorbent resin include a film or sheet obtained by forming the water absorbent resin into a film shape (for example, by melt extrusion).

(2) Examples of laminates of a formed product of a water absorbent resin and a surface-treated absorptive layer include a laminate obtained by subjecting a film or sheet obtained by forming a water absorbent resin into a film shape (for example, by melt extrusion) to a hydrophilization treatment, and forming a surface-treated layer on a surface of the film or sheet. Examples of hydrophilization treatments include a saponification treatment, an oxygen plasma treatment, and the like, and a laminate may be provided with a saponification-treated layer.

Examples of water absorbent resins include cellulose-based resins, polyvinyl alcohol-based resins, polyvinyl acetal-based resins, polyvinylpyrrolidone-based resins, polyvinyl acetate-based resins, polyvinyl acetamide-based resins, and the like. Among them, cellulose-based resins or polyvinyl alcohol-based resins are preferable because they have excellent formability and water absorption properties.

Examples of cellulose-based resins include triacetyl cellulose (TAC), nitrocellulose, hydroxypropyl cellulose, hydroxyethyl cellulose, and the like, and commercially available products on markets may be used. Examples of commercially available products include saponification-treated triacetyl cellulose (a thickness of a saponification-treated layer: 7 to 8 μm, a water absorption rate: 15%) manufactured by TOCHISEN. From the viewpoint of water absorption properties, a thickness of a saponification-treated layer is preferably equal to or more than 0.5 μm, and more preferably equal to or more than 5 μm.

The water absorbent film preferably contains a water absorbent resin. The water absorbent film, which may be any of a water absorbent film containing one kind of the above-mentioned resins or a water absorbent film containing two or more kinds of the above-mentioned resins, is more preferably a triacetyl cellulose film containing triacetyl cellulose. The water absorbent film is even more preferably a triacetyl cellulose film that has been subjected to a hydrophilization treatment. A content of inorganic oxide particles in the water absorbent film is preferably less than 10 mass %, more preferably equal to or less than 1 mass %, and even more preferably equal to or less than 0.1 mass % with respect to a total mass of the water absorbent film, and it is most preferable that inorganic oxide particles be not contained. The water absorbent film is preferably formed of a water absorbent resin.

A thickness of the water absorbent film may be appropriately selected depending on usage applications, purposes, or structures. A thickness thereof is preferably within a range of several tens μm to several hundreds μm and is more preferably 20 μm to 400 μm from the viewpoint of ensuring a water absorption capacity and also imparting a function as a support.

(Coating Layer)

The coating layer in the present disclosure contains inorganic oxide particles and a water absorbent resin, and may further contain other components as necessary.

The antifogging laminate of the present disclosure has a structure in which the coating layer containing inorganic oxide particles and a water absorbent resin is laminated on the above-mentioned water absorbent film as an upper layer of a hydrophilic water-absorbent hybrid type. As a result, first, hydrophilicity is obtained from the inorganic oxide particles, an appropriate water film is formed instead of water droplets, and thereby antifogging properties are ensured; and furthermore, in a case where an amount of water adhering to the coating layer increases, water permeates the lower layer side and is stored in the water absorbent film. Accordingly, it is possible to maintain antifogging properties for a long period of time. In the present structure, since the water absorbent resin is appropriately covered with the inorganic oxide particles, a low molecular weight component derived from the water absorbent resin is unlikely to be eluted, and as a result, dried marks are unlikely to be generated even after a surface that has been wet with water is dried.

From the viewpoint of ensuring antifogging properties and ensuring strength (for example, scratch resistance) and water dripping resistance of a coated film, changes in film thickness of the coating layer, which are obtained by measuring swelling of the film in a case where the coating layer is immersed in water with a contact type film thickness meter, are preferably within a range of 110% to 140% and are more preferably within a range of 115% to 120% with respect to an original film thickness. Furthermore, in the coating layer, a modulus of elasticity in water is preferably equal to or more than 0.2 GPa and is more preferably equal to or more than 0.3 GPa from the viewpoint of ensuring strength (for example, scratch resistance) and water dripping resistance of a coated film. In addition, an elastic recovery rate is preferably equal to or more than 25% and is more preferably equal to or more than 40%.

The coating layer may be provided on a part of the water absorbent film, or may be provided on the entire surface of the water absorbent film. Furthermore, the coating layer may be provided in a state of being in direct contact with the water absorbent film, or may be provided on the water absorbent film with another layer therebetween.

Hereinafter, each component that may be contained in the coating layer of the present disclosure will be described.

—Water Absorbent Resin—

The "water absorbent resin" means the entire water absorbent resin contained in the coating layer according to the present disclosure.

Examples of water absorbent resins include cellulose-based resins, polyvinyl alcohol-based resins, polyvinyl acetal-based resins, polyvinylpyrrolidone-based resins, polyvinyl acetate-based resins, polyvinyl acetamide-based resins, and the like, where polyvinyl alcohol-based resins are preferable, and polyvinyl alcohol is more preferable.

Examples of cellulose-based resins include triacetyl cellulose (TAC), nitrocellulose, hydroxypropyl cellulose, hydroxyethyl cellulose, and the like, and commercially available products on markets may be used. Examples of commercially available products include "HEC AL-15 (hydroxyethyl cellulose)" manufactured by Sumitomo Seika Chemicals Co., Ltd., and the like. Examples of polyvinyl alcohol-based resins include polyvinyl alcohol, partially saponified polyvinyl alcohol, and the like, and commercially available products on markets may be used. Examples of commercially available products include "GOHSENX" series manufactured by Nippon Synthetic Chemical Industry Co., Ltd., "POVAL (polyvinyl alcohol)" manufactured by Kuraray Co., Ltd., and the like. Examples of polyvinyl acetal-based resins include polyvinyl acetal, polyvinyl butyral, and the like, and commercially available products on markets may be used. Examples of commercially available products include "S-LEC (polyvinyl acetal)" manufactured by SEKISUI CHEMICAL CO., LTD., and the like. Examples of polyvinylpyrrolidone-based resins include polyvinylpyrrolidone, a vinylpyrrolidone/vinyl acetate copolymer, and the like, and commercially available products on markets may be used. Examples of commercially available products include "PITZCOL (polyvinylpyrrolidone)" manufactured by DKS Co., Ltd., and the like. Examples of polyvinyl acetate-based resins include polyvinyl acetate, a vinylpyrrolidone/vinyl acetate copolymer, and the like, and commercially available products on markets may be used. Examples of commercially available products include "S-630 (vinylpyrrolidone/vinyl acetate copolymer)" manufactured by Ashland Japan Co., Ltd., and the like. Examples of polyvinyl acetamide-based resins include poly-N-vinyl acetamide and the like, and commercially available products on markets may be used. Examples of commercially available products include [GE191 (poly-N-vinylacetamide)] manufactured by Showa Denko K. K., and the like.

—Inorganic Oxide Particles—

The coating layer according to the present disclosure contains inorganic oxide particles. The coating layer according to the present disclosure may contain only one kind of inorganic oxide particles, or may contain two or more kinds of inorganic oxide particles. Inorganic oxide particles contribute to improving strength (for example, scratch resistance) of a coated film and improving water dripping resistance.

Metal oxide particles are preferable as the inorganic oxide particles. Metals in the metal oxide particles also include semimetals such as B, Si, Ge, As, Sb, and Te. As the metal oxide particles, oxide particles containing atoms such as Be, Mg, Ca, Sr, Ba, Sc, Y, La, Ce, Gd, Tb, Dy, Yb, Lu, Ti, Zr, Hf, Nb, Mo, W, Zn, B, Al, Si, Ge, Sn, Pb, Sb, Bi, and Te are preferable. Furthermore, metal oxide particles in which a Mohs hardness is equal to or more than 6 are particularly preferable from the viewpoint of scratch resistance of a coated film. For example, silica particles, titania particles, zirconia particles, alumina particles, and the like are used, and silica particles and alumina particles are particularly preferably used.

The inorganic oxide particles are also available as commercially available products. Examples of commercially available products of silica particles include AEROSIL (registered trademark) series manufactured by Evonik Industries, SNOWTEX (registered trademark) series (for example, SNOWTEX O, SNOWTEX O-33, and the like) manufactured by Nissan Chemical Industries, Ltd., Nalco (registered trademark) series (for example, Nalco 8699 and the like) manufactured by Nalco Chemical Company, Quartron PL series (for example, PL-1) manufactured by Fuso Chemical Co., Ltd., and the like. Examples of commercially available products of alumina particles include Alumina sol series (for example, Alumisol-F3000 and the like) manufactured by Kawaken Fine Chemicals Co., Ltd., BIRAL series (for example, A1-L7 and the like) manufactured by TAKI CHEMICAL CO., LTD., and the like.

The coating layer in the present disclosure may contain only one kind of inorganic oxide particles, or may contain two or more kinds thereof. In a case where two or more kinds of inorganic oxide particles are contained, different particles in which at least one of sizes or shapes are different from each other may be contained.

Examples of shapes of the inorganic oxide particles include a spherical shape, a plate shape, a needle shape, a bead shape, and a shape in which two or more of these shapes are combined. The term "spherical shape" referred to herein includes not only a true spherical shape but also a spheroidal shape, an oval shape, and the like. Regarding the shape, it is preferable that particles having a large average aspect ratio be contained from the viewpoint of scratch resistance of a coated film. Specifically, particles having an average aspect ratio of 5 to 5,000 are preferable, particles having an average aspect ratio of 5 to 3,000 are more preferable, and particles having an average aspect ratio of 30 to 1,000 are even more preferable. By setting an aspect ratio to equal to or less than 5,000, particle dispersibility is improved, and a coated film is more transparent.

The inorganic oxide particles are preferably alumina particles having an average aspect ratio of 5 to 5,000, are more preferably alumina particles having an average aspect ratio of 5 to 3,000, and are even more preferably alumina particles having an average aspect ratio of 30 to 1,000.

A content of particles having a large average aspect ratio in all the inorganic oxide particles is desirably equal to or more than 20% and equal to or less than 80% from the viewpoint of transparency of a coated film and film-forming properties.

An average aspect ratio means an L/r ratio in a case where an average minor axis of inorganic particles in a thickness direction orthogonal to a long axis direction of the inorganic particles is r (nm), and an average major axis of the inorganic particles in the long axis direction of the inorganic particles is L (nm). That is, an aspect ratio can be calculated by observing inorganic particles contained in an aqueous composition and dividing a major axis of the inorganic particles by a minor axis.

In the present disclosure, an average minor axis r (nm) of the inorganic particles is preferably 1 to 20 nm from the viewpoint of transparency of a coated film. An average minor axis r (nm) is preferably equal to or more than 1 nm and is more preferably equal to or more than 2 nm. An average minor axis r (nm) is preferably equal to or less than 20 nm, is more preferably equal to or less than 15 nm, and is even more preferably equal to or less than 10 nm. In addition, an average major axis L (nm) is preferably 100 to 10,000 nm. An average major axis L (nm) is preferably equal to or more than 100 nm, is more preferably equal to or more than 300 nm, and is even more preferably equal to or more than 700 nm. Furthermore, an average major axis L (nm) is preferably equal to or less than 10,000 nm, is more preferably equal to or less than 8,000 nm, and is even more preferably equal to or less than 5,000 nm. By setting a minor axis and a major axis of the inorganic particles within the above-mentioned range, it is possible to set an average aspect ratio of the inorganic particles within a preferable range.

A length of the above-mentioned inorganic particles can be measured using an optical microscope or an electron microscope. For example, it is possible to obtain an aspect ratio by selecting 100 arbitrary inorganic particles having a major axis of equal to or more than 100 nm and existing in a cross section perpendicular to a longitudinal direction of a hard coating layer and a cross section parallel to the longitudinal direction using a scanning electron microscope (SEM), and measuring a major axis and a minor axis of these inorganic particles. A major axis and a minor axis are measured for every 100 inorganic particles, and an average aspect ratio can be calculated from aspect ratios of these inorganic particles.

A content of the inorganic oxide particles in the coating layer is preferably equal to or more than 10 mass %, is more preferably equal to or more than 20 mass %, and is even more preferably equal to or more than 40 mass %, with respect to a total solid content of the coating layer from the viewpoint that then, hydrophilicity of the coating layer is favorable, and the coating layer has excellent hardness, scratch resistance, and the like. Furthermore, an upper limit of the content of the inorganic oxide particles is preferably equal to or less than 80 mass % with respect to a total mass of solid contents of the coating layer from the viewpoint of maintaining an antifogging performance of the coating layer.

<Other Additives>

The coating layer in the present disclosure may further contain other additives as necessary in addition to the components described above, as long as the effects according to the present disclosure are not impaired. Examples of other additives include binding agents for inorganic oxide particles, resins having an acid group which contribute as a dispersant for inorganic oxide particles, curing catalysts for water absorbent resins, high boiling point solvents, solvents other than high boiling point solvents, antistatic agents for improving an effect of preventing adherence of contaminated substances, surfactants, adhesion aids used for the purpose of improving film properties of a coating layer, adhesiveness to a base material, and the like, ultraviolet absorbers that prevent deterioration due to light, antioxidants that prevent deterioration due to heat, and the like.

—Binding Agent for Inorganic Oxide Particles—

It is desirable that the coating layer in the present disclosure (or a composition for forming a coating layer) contain a binding agent for inorganic oxide particles. Specifically, it is preferable that an organometallic compound be contained. The organometallic compound can be incorporated in the coating layer by incorporating the organometallic compound in the composition for forming a coating layer. By incorporating the organometallic compound in the composition for forming a coating layer, binding of the inorganic oxide particles to each other is promoted, and film-forming properties of an application liquid are enhanced.

Examples of organometallic compounds include metal chelate compounds (such as aluminum chelate compounds such as aluminum mono(acetylacetonate) bis(ethyl acetoacetate), aluminum tris(acetylacetonate), and aluminium ethyl acetoacetate diisopropylate, zirconium chelate compounds such as zirconium tetrakis(acetylacetonate) and zirconium bis(butoxy) bis(acetylacetonate), and titanium chelate compounds such as titanium tetrakis(acetylacetonate) and titanium bis(butoxy) bis(acetylacetonate));

organic tin compounds such as dibutyltin diacetate, dibutyltin dilaurate, and dibutyltin dioctate; aluminum alkoxides such as aluminum ethylate, aluminum isopropylate, and aluminum sec-butyrate; titanium alkoxides such as titanium (IV) ethoxide, titanium isopropoxide, and titanium (IV) n-butoxide; zirconium alkoxides such as zirconium (IV) ethoxide, zirconium (IV) n-propoxide, and zirconium (IV) n-butoxide; and the like. Among them, as the organometallic compound, metal chelate compounds such as aluminum chelate compounds, titanium chelate compounds, and zirconium chelate compounds are preferable, and aluminum chelate compounds are more preferable.

In a case where the coating layer (or the composition for forming a coating layer) contains an organometallic compound, a content of the organometallic compound is preferably 0.1 mass % to 40 mass %, is more preferably 1 mass % to 30 mass %, and is even more preferably 5% to 20 mass % with respect to a total mass of solid contents.

By setting a content of the organometallic compound within the above-mentioned range, a coating layer having scratch resistance is easily formed. In addition, the coating layer has excellent formability.

Furthermore, as a binding agent for inorganic oxide particles, a hydrolysis condensate of the following siloxane compound can also be suitably used. By incorporating a hydrolysis condensate of the siloxane compound, retention of the inorganic oxide particles is favorable, and scratch resistance and hydrophilicity of the coating layer are favorable.

General Formula (3)

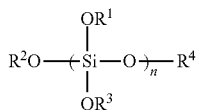

In General Formula (3), $R^1$, $R^2$, $R^3$, and $R^4$ each independently represent a monovalent organic group having 1 to 6 carbon atoms. n represents an integer of 1 to 20.

The monovalent organic group having 1 to 6 carbon atoms for $R^1$, $R^2$, $R^3$, and $R^4$ may be linear, branched, or cyclic. Examples of monovalent organic groups include an alkyl group, an alkenyl group, and the like, and an alkyl group is preferable.

In a case where $R^1$, $R^2$, $R^3$, or $R^4$ represents an alkyl group, examples of alkyl groups include a methyl group, an ethyl group, a propyl group, an isopropyl group, an n-butyl group, a tert-butyl group, an n-pentyl group, an n-hexyl group, a cyclohexyl group, and the like.

In a case where $R^1$, $R^2$, $R^3$, or $R^4$ represents an alkenyl group, examples of alkenyl groups include a vinyl group, a 1-methyl-vinyl group, a 2-methyl-vinyl group, an n-2-propenyl group, a 1,2-dimethyl-vinyl group, a 1-methyl-propenyl group, a 2-methyl-propenyl group, an n-1-butenyl group, an n-2-butenyl group, an n-3-butenyl group, and the like.

In a case where the number of carbon atoms is 1 to 6 in a monovalent organic group for $R^1$ to $R^4$ in the siloxane compound, preferably in an alkyl group, the siloxane compound has favorable hydrolyzability. From the viewpoint of further favorable hydrolyzability, it is more preferable that $R^1$ to $R^4$ be each independently an alkyl group having 1 to 4 carbon atoms, and it is even more preferable that $R^1$ to $R^4$ be each independently an alkyl group having 1 or 2 carbon atoms.

N in General Formula (3) represents an integer of 1 to 20. In a case where n is 1 or more, reactivity of the siloxane compound can be easily controlled, and for example, a film having excellent surface hydrophilicity can be formed. In a case where n is 20 or less, a viscosity of the composition for forming a coating layer is not excessively increased, and thereby handleability and uniform application properties are favorable. n is preferably 3 to 12, and is more preferably 5 to 10.

At least a part of the siloxane compound is hydrolyzed in a case where it coexists with water. A hydrolyzate of the siloxane compound is a compound in which at least a part of $OR^1$, $OR^2$, $OR^3$, and $OR^4$ bonded to the silicon atom of the siloxane compound is substituted with a hydroxy group by the reaction of the siloxane compound and water, and therefor, it is presumed that the surface hydrophilicity of the coating layer formed by, for example, application and drying is favorable due to the hydroxy group, which is a hydrophilic group.

It is not necessary that all the terminal groups (that is, $—OR^1$, $—OR^2$, $—OR^3$, or $—OR^4$) of the siloxane compound react during the hydrolysis reaction, but it is preferred that more terminal groups be hydrolyzed from the viewpoint of, for example, improving the hydrophilicity of a coated film obtained by applying the application liquid for forming a coating layer and drying it.

In a case of forming the coating layer of the present embodiment, at least some of the hydroxy groups of the siloxane compound are bonded to each other, and the siloxane compound is condensed. Accordingly, the coating layer contains at least one hydrolysis condensate of the siloxane compound. A composition for forming a coating layer which is used for forming the coating layer may contain only one kind of the hydrolyzates of the siloxane compound, or may contain two or more kinds thereof.

A weight-average molecular weight of the siloxane compound is preferably in a range of 300 to 1,500, and more preferably in a range of 500 to 1,200.

In a case where the coating layer (or the composition for forming a coating layer) contains the siloxane compound, a content of the siloxane compound is preferably 0.1 mass % to 40 mass %, is more preferably 1 mass % to 30 mass %, and is even more preferably 5% to 20 mass % with respect to a total mass of solid contents.

By setting a content of the siloxane compound within the above-mentioned range, a coating layer having scratch resistance is easily formed. In addition, the coating layer has excellent formability.

—Resin Having an Acid Group—

The coating layer (or the composition for forming a coating layer) in the present disclosure can include a resin having an acid group. The acid group in the resin having an acid group is not limited as long as it is an acid group having an adsorption performance with respect to inorganic oxide particles, and examples thereof include a carboxy group, a sulfonic acid group, and a phosphoric acid group.

An acid value of the resin having an acid group is preferably 180 mgKOH/g or less, and is more preferably 100 mgKOH/g or less, from the viewpoints of development of an adsorption performance with respect to inorganic oxide particles, improvement of dispersibility of inorganic oxide particles, uniformization of void sizes between inorganic oxide particles, and the like. Although a lower limit value of the acid value is not particularly limited, it is preferably 3 mgKOH/g or more.

An acid value of the resin having an acid group can be measured by titration with an indicator. Specifically, according to a method described in JIS K 0070, an acid value can be calculated by measuring the number of mg of potassium hydroxide that neutralizes an acid component in 1 g of the solid content of the resin having an acid group.

In addition, a weight-average molecular weight (Mw) of the resin having an acid group is preferably 1,000 to 200,000, more preferably 1,000 to 50,000, and even more preferably 5,000 to 30,000, from the viewpoints of development of an adsorption performance with respect to inorganic oxide particles, improvement of dispersibility of inorganic oxide particles, uniformization of void sizes between inorganic oxide particles, and the like.

The resin having an acid group is also available as a commercially available product. Examples of commercially available products of the resin having an acid group that can be used for the coating layer in the present disclosure include DISPERBYK (registered trademark)-2015 (acid group: carboxy group, acid value: 10 mgKOH/g), DISPERBYK (registered trademark)-2010 (acid group: carboxy group, acid value: 20 mgKOH/g), and DISPERBYK (registered trademark)-194 ((acid group: carboxy group, acid value: 70 mgKOH/g) manufactured by BYK-Chemie company; Aaron (registered trademark) A-6012 (acid group: sulfonic acid group, weight-average molecular weight: 10,000), Aaron (registered trademark) A-6001 (acid group: carboxy group, pH: 7 to 9 (aqueous solution concentration), weight-average molecular weight: 8,000), and Aaron (registered trademark) SD-10 (acid group: carboxy group, pH: 2 to 5 (aqueous solution concentration), weight-average molecular weight: 10000) manufactured by Toagosei Co., Ltd.; TEGO (registered trademark) Dispers 651 (acid group: phosphoric acid group, acid value: 30 mgKOH/g) manufactured by Evonik Industries; and the like.

The coating layer in the present disclosure may include only one kind of resins having an acid group, or may include two or more kinds thereof.

A content of the resin having an acid group in the coating layer (or the composition for forming a coating layer) is preferably in a range of 20 mass % to 60 mass %, is more preferably in a range of 25 mass % to 50 mass %, and is even more preferably in a range of 30 mass % to 45 mass %, with respect to a content of the inorganic oxide particles.

—Crosslinking Agent—

The composition for forming a coating layer according to the present disclosure preferably contains a crosslinking agent. By forming a crosslinked structure in the coating layer by incorporating the crosslinking agent thereto, crosslinking of a water absorbent resin is formed. Accordingly, it is possible to form an antifogging laminate having a crosslinked structure, excellent scratch resistance, and capable of controlling water absorption and water dripping resistance depending on a crosslink density.

The crosslinking agent more preferably contains at least one selected from the group consisting of a compound having an epoxy group, a compound having an oxetanyl group, a blocked isocyanate compound, an ethylenically unsaturated compound, a polyfunctional mercapto compound, and a methylol compound. By using the crosslinking agent, the antifogging laminate has further excellent scratch resistance.

(1) Compound Having Epoxy Group

The compound having an epoxy group is a compound having at least one epoxy group in a molecule, and the number of epoxy groups in the molecule is preferably 2 or more.

Specific examples of compounds having two or more epoxy groups in a molecule include a bisphenol A type epoxy resin, a bisphenol F type epoxy resin, a phenol novolac type epoxy resin, a cresol novolac type epoxy resin, an aliphatic epoxy resin, and the like.

As the compound having an epoxy group, commercially available products on the market may be used. Examples of commercially available products include the following epoxy resins. Specific examples of bisphenol A type epoxy resins include JER827, JER828, JER834, JER1001, JER1002, JER1003, JER1055, JER1007, JER1009, and JER1010 (all of which are manufactured by Japan Epoxy Resins Co., Ltd.), and EPICLON860, EPICLON1050, EPICLON1051, and EPICLON1055 (all of which are manufactured by DIC Corporation).

Examples of bisphenol F type epoxy resins include JER806, JER807, JER4004, JER4005, JER4007, and JER4010 (all of which are manufactured by Japan Epoxy Resins Co., Ltd.), EPICLON830 and EPICLON835 (both manufactured by DIC Corporation), LCE-21 and RE-602S (both manufactured by Nippon Kayaku Co., Ltd.), and the like.

Examples of phenol novolac type epoxy resins include JER152, JER154, JER157S70, and JER157S65 (all of which are manufactured by Japan Epoxy Resins Co., Ltd.), EPICLON N-740, EPICLON N-740, EPICLON N-770, and EPICLON N-775 (all of which are manufactured by DIC Corporation), and the like.

Examples of cresol novolac type epoxy resins include EPICLON N-660, EPICLON N-665, EPICLON N-670, EPICLON N-673, EPICLON N-680, EPICLON N-690, and EPICLON N-695 (all of which are manufactured by DIC Corporation), EOCN-1020 (manufactured by Nippon Kayaku Co., Ltd.), and the like.

Examples of aliphatic epoxy resins include ADEKA RESIN EP-4080S, ADEKA RESIN EP-4085S, and ADEKA RESIN EP-4088S (all of which are manufactured by ADEKA Corporation), Celoxide 2021P, Celoxide 2081, Celoxide 2083, Celoxide 2085, EHPE 3150, EPOLEAD PB 3600, and EPOLEAD PB 4700 (all of which are manufactured by Daicel Chemical Industries, Ltd.), and the like.

In addition to the above examples, examples further include ADEKA RESIN EP-4000S, ADEKA RESIN EP-4003S, ADEKA RESIN EP-4010S, and ADEKA RESIN EP-4011S (all of which are manufactured by ADEKA Corporation), NC-2000, NC-3000, NC-7300, XD-1000, EPPN-501, and EPPN-502 (all of which are manufactured by ADEKA CORPORATION), and the like.

Furthermore, urethane compounds having an ethylene oxide skeleton described in JP1983-049860B (JP-S58-049860A), JP1981-017654B (JP-S56-017654B), JP1987-039417B (JP-S62-039417B), or JP1987-039418B (JP-S62-039418B) are also suitable.

In a case where the composition for forming a coating layer contains the compound having an epoxy group, a content of the compound having an epoxy group is preferably 0.1 mass % to 20 mass %, more preferably 0.5 mass % to 10 mass %, and even more preferably 1% to 5 mass % with respect to a total mass of solid contents.

The composition for forming a coating layer may contain one kind of the compounds having an epoxy group, or may contain two or more kinds thereof. In a case where two or more kinds are incorporated, a total amount of the two or more kinds of compounds is preferably within the abovementioned range.

(2) Compound Having Oxetanyl Group

The compound having an oxetanyl group is a compound having at least one oxetanyl group in a molecule, and the number of oxetanyl groups in the molecule is preferably 2 or more. Specific examples of compounds having an oxetanyl group include Aron oxetane OXT-121, OXT-221, OX-SQ, and PNOX (all of which are manufactured by Toagosei Co., Ltd.). In addition, one kind of the compounds having an oxetanyl group is preferably used alone or as a mixture with a compound containing an epoxy group.

In a case where the composition for forming a coating layer contains the compound having an oxetanyl group, a content of the compound having an oxetanyl group is preferably 0.1 mass % to 20 mass %, more preferably 0.5 mass % to 10 mass %, and even more preferably 1% to 5 mass % with respect to a total mass of solid contents. The composition for forming a coating layer may contain one kind of the compounds having an oxetanyl group, or may contain two or more kinds thereof. In a case where two or more kinds are incorporated, a total amount of the two or more kinds of compounds is preferably within the above-mentioned range.

(3) Blocked Isocyanate Compound

The blocked isocyanate compound is not limited as long as it has a blocked isocyanate group in a molecule, and from the viewpoint of curing properties, a compound having two or more blocked isocyanate groups in a molecule is preferable. An upper limit of the number of blocked isocyanate groups is not particularly limited, but it is preferably 6 or less.

Furthermore, a skeleton of the blocked isocyanate compound is not particularly limited, it may be appropriately selected from compounds having two or more isocyanate groups in a molecule, and it may be any of aliphatic, alicyclic, or aromatic polyisocyanates.

As the blocked isocyanate compound, it is possible to suitably use isocyanate compounds such as 2,4-tolylene diisocyanate, 2,6-tolylene diisocyanate, isophorone diisocyanate, 1,6-hexamethylene diisocyanate, 1,3-trimethylene diisocyanate, 1,4-tetramethylene diisocyanate, 2,2,4-trimethylhexamethylene diisocyanate, 2,4,4-trimethylhexamethylene diisocyanate, 1,9-nonamethylene diisocyanate, 1,10-decamethylene diisocyanate, 1,4-cyclohexane diisocyanate, 2,2'-diethyl ether diisocyanate, diphenylmethane-4,4'-diisocyanate, o-xylene diisocyanate, m-xylene diisocyanate, p-xylene diisocyanate, methylene bis(cyclohexyl isocyanate), cyclohexane-1,3-dimethylene diisocyanate, cyclohexane-1,4-dimethylene diisocyanate, 1,5-naphthalenediisocyanate, p-phenylene diisocyanate, 3,3'-methylene ditrilene-4,4'-diisocyanate, 4,4'-diphenyl ether diisocyanate, tetrachlorophenylene diisocyanate, norbornane diisocyanate, hydrogenated 1,3-xylylene diisocyanate, hydrogenated 1,4-xylylene diisocyanate, and diphenylmethane diisocyanate (MDI); and prepolymer-type skeleton compounds derived from these compounds. Among them, tolylene diisocyanate (TDI), diphenylmethane diisocyanate, hexamethylene diisocyanate (HDI), and isophorone diisocyanate (IPDI) are more preferable.

Examples of mother structures of the blocked isocyanate compound include a biuret type, an isocyanurate type, an adduct type, a bifunctional prepolymer type, and the like.

Examples of blocking agents that form a block structure of the blocked isocyanate compound include an oxime compound, a lactam compound, a phenol compound, an alcohol compound, an amine compound, an active methylene compound, a pyrazole compound, a mercaptan compound, an imidazole-based compound, an imide-based compound, and the like. Among them, a blocking agent selected from an oxime compound, a lactam compound, a phenol compound, an alcohol compound, an amine compound, an active methylene compound, and a pyrazole compound is particularly preferable.

As the blocked isocyanate compound, commercially available products on markets may be used. As commercially available products, Coronate AP Stable M, Coronate 2503, 2515, 2507, 2513, and 2555, and Millionate MS-50 (all manufactured by Nippon Polyurethane Industry Co., Ltd.), TAKENATE B-830, B-815N, B-820NSU, B-842N, B-846N, B-870N, B-874N, B-882N, WB-3936, WB-F271, and WB-F206 (all manufactured by Mitsui Chemicals, Inc.), DURANATE 17B-60P, 17B-60PX, 17B-60P, TPA-B80X, TPA-B80E, MF-B60X, MF-B60B, MF-K60X, MF-K60B, E402-B80B, SBN-70D, SBB-70P, K6000, WP32-B75P, and WM44-L70G (all manufactured by Asahi Kasei Chemicals Co., Ltd.), Death Module BL1100, BL1265 MPA/X, BL3575/1, BL3272MPA, BL3370MPA, BL3475BA/SN, BL5375MPA, VPLS2078/2, BL4265SN, PL340, PL350, and Sumijour BL3175 (all manufactured by Sumika Bayer Urethane Co., Ltd.), and the like are suitable.

The composition for forming a coating layer may contain one kind of the blocked isocyanate compounds, or may contain two or more kinds thereof. In a case where two or more kinds are incorporated, a total amount of the two or more kinds of compounds is preferably within the above-mentioned range.

In a case where the composition for forming a coating layer contains the blocked isocyanate compound, a content of the blocked isocyanate compound is preferably 0.1 mass % to 20 mass %, more preferably 0.5 mass % to 10 mass %, and even more preferably 1% to 5 mass % with respect to a total mass of solid contents.

(4) Polyfunctional Mercapto Compound

The polyfunctional mercapto compound is not particularly limited as long as it is a compound having two or more mercapto groups in a molecule, where a compound having two to six mercapto groups in a molecule is preferable, and a compound having two to four mercapto groups in a molecule is more preferable.

As the polyfunctional mercapto compound, an aliphatic polyfunctional mercapto compound is preferable. A preferable example of the aliphatic polyfunctional mercapto compound is a compound composed of a combination of an aliphatic hydrocarbon group and —O— and —C(=O)—, in which at least two hydrogen atoms of the aliphatic hydrocarbon group are substituted with a mercapto group.

Examples of aliphatic polyfunctional mercapto compounds include pentaerythritol tetrakis(3-mercaptobutyrate), 1,4-bis(3-mercaptobutyryloxy)butane, and the like. Commercially available products on markets may be used, and examples of commercially available products include Karenz MT-PE-1, Karenz MT-BD-1, and Karenz MT-NR-1 (all manufactured by Showa Denko K. K.), and the like.

In a case where the composition for forming a coating layer contains the polyfunctional mercapto compound, a content of the polyfunctional mercapto compound is preferably 0.1 mass % to 20 mass %, more preferably 0.5 mass % to 10 mass %, and even more preferably 1% to 5 mass % with respect to a total mass of solid contents.

The composition for forming a coating layer may contain one kind of the polyfunctional mercapto compound, or may contain two or more kinds thereof. In a case where two or more kinds are incorporated, a total amount of the two or more kinds of compounds is preferably within the above-mentioned range.

(5) Ethylenically Unsaturated Compound

Specific examples of ethylenically unsaturated compounds include (meth)acrylate monomers and vinyl monomers described in JP2010-034513A.

In a case where the composition for forming a coating layer contains the ethylenically unsaturated compound, a content of the ethylenically unsaturated compound is preferably 0.1 mass % to 20 mass %, more preferably 0.5 mass % to 10 mass %, and even more preferably 1% to 5 mass % with respect to a total mass of solid contents.

The composition for forming a coating layer may contain one kind of the ethylenically unsaturated compound, or may contain two or more kinds thereof. In a case where two or more kinds are incorporated, a total amount of the two or more kinds of compounds is preferably within the above-mentioned range.

(6) Methylol Compound

The methylol compound is a compound having at least one of methylol group, an alkoxymethyl group (etherified methyl group), or an acyloxymethyl group (esterified methyl group) in a molecule. A part of hydrogen atoms contained in the methylol group, the alkoxymethyl group, or the acyloxymethyl group may be substituted with a halogen atom. The methylol compound is preferably a compound having at least one of a methylol group or an alkoxymethyl group in a molecule.

The above methylol compound has one or more of a methylol group, an alkoxymethyl group, or an acyloxymethyl group in a molecule, preferably has two to ten thereof, more preferably has two to eight thereof, and even more preferably has two to four thereof.

An alkoxy group of the alkoxymethyl group preferably has 1 to 6 carbon atoms, more preferably has 1 to 4 carbon atoms, even more preferably has 1 to 3 carbon atoms, and particularly preferably has 1 or 2 carbon atoms, and a methoxy group is most preferable. An alkoxy group may have a linear or branched alkyl group, but it preferably has a linear alkyl group.

The acyloxymethyl group is represented by R—C(=O)—O—CH$_2$—, and R is not particularly limited as long as it is a monovalent organic group, but an alkyl group or an aryl group is preferably exemplified, where an alkyl group is more preferable. R preferably has 1 to 20 carbon atoms, more preferably has 1 to 12 carbon atoms, and even more preferably has 1 to 6 carbon atoms.

Examples of methylol compounds include a methylol melamine compound, a methylol guanamine compound, a methylol urea compound, a resole resin, an aromatic compound in which a hydrogen atom on an aromatic ring is substituted with a methylol group or an alkoxymethyl group, and the like. Among them, the methylol compound is preferably a methylol melamine compound, a methylol guanamine compound, a methylol urea compound, or an aromatic compound in which a hydrogen atom on the aromatic ring is substituted with a methylol group or an alkoxymethyl group, is more preferably a compound having a nitrogen element that binds to a methylol group or an alkoxymethyl group, is even more preferably a methylol melamine compound, a methylol guanamine compound, or a methylol urea compound, is particularly preferably a methylol melamine compound or a methylol urea compound, and is most preferably a methylol melamine compound.

Examples of methylol compounds include 1,3-(hydroxymethyl)urea and the like. Products on markets may be used, and examples thereof include NIKALAC MX-035, NIKALAC MX-706, NIKALAC MX-730, NIKALAC MX-708, NIKALAC MS-21, NIKALAC MW-22, NIKARESIN S-176, NIKARESIN S-260, NIKALAC MX-270, NIKALAC MW-100LM, NIKALAC MX-280, and NIKALAC MX-290 (all manufactured by Sanwa Chemical Co., Ltd.), and the like.

In a case where the composition for forming a coating layer contains the methylol compound, a content of the methylol compound is preferably 0.1 mass % to 20 mass %, more preferably 0.5 mass % to 10 mass %, and even more preferably 1% to 5 mass % with respect to a total mass of solid contents.

The composition for forming a coating layer may contain one kind of the methylol compound, or may contain two or more kinds thereof. In a case where two or more kinds are incorporated, a total amount of the two or more kinds of compounds is preferably within the above-mentioned range.

—Curing Catalyst—

The composition for forming a coating layer according to the present disclosure preferably contains a curing catalyst. A crosslinking reaction can be promoted by incorporating the curing catalyst in the composition for forming a coating layer.

Examples of curing catalysts include acid catalysts, photoacid generators, thermal acid generators, photobase generators, thermal base generators, and photopolymerization initiators. Examples of acid catalysts include phosphoric acid, acetic acid, methanesulfonic acid, trifluoromethanesulfonic acid, benzenesulfonic acid, p-toluenesulfonic acid, 10-camphorsulfonic acid, fluorosulfonic acid, and the like.

Examples of photoacid generators include diazonium salts, phosphonium salts, sulfonium salts, iodonium salts, imide sulfonates, oxime sulfonates, diazodisulfones, disulfones, and o-nitrobenzyl sulfonates. Preferable examples of photosensitizers include imide sulfonate, oxime sulfonate, and o-nitrobenzyl sulfonate, which are compounds that generate sulfonic acid.

Examples of thermal acid generators include K-PURE TAG series and K-PURE CXC series manufactured by Kusumoto Kasei, and the like.

Examples of photobase generators include 2-nitrobenzylcyclohexylcarbamate, triphenylmethanol, O-carbamoyl hydroxylamine, O-carbamoyl oxime, [[(2,6-dinitrobenzyl)oxy]carbonyl]cyclohexylamine, bis[[(2-nitrobenzyl)oxy]carbonyl]hexane 1,6-diamine, 4-(methylthiobenzoyl)-1-methyl-1-morpholinoetan, (4-morpholine benzoyl)-1-benzyl-1-dimethylaminopropane, N-(2-nitrobenzyloxycarbonyl)pyrrolidine, hexaamminecobalt (III) tris(triphenylmethylborate), 2-benzyl-2-dimethylamino-1-(4-morpholinophenyl)-butanone, 2,6-dimethyl-3,5-diacetyl-4-(2'-nitrophenyl)-1,4-dihydropyridine, 2,6-dimethyl-3,5-diacetyl-4-(2',4'-dinitrophenyl)-1,4-dihydropyridine, and the like.

As examples of thermal base generators, compounds described in WO2015/199219A can be used.

Examples of photopolymerization initiators include Irgacure (registered trademark) 2959 (1-[4-(2-hydroxyethoxy)phenyl]-2-hydroxy-2-methyl-1-propan-1-one), Irgacure (registered trademark) 184 (1-hydroxycyclohexylphenylketon), Irgacure (registered trademark) 500 (1-hydroxycyclohexylphenylketone, benzophenone), Irgacure (registered trademark) 651 (2,2-dimethoxy-1,2-diphenylethan-1-one), Irgacure (registered trademark) 369 (2-benzyl-2-dimethylamino-1-(4-morpholinophenyl)butanone-1), Irgacure (registered trademark) 907 (2-methyl-1[4-methylthiophenyl]-2-morpholinopropan-1-one), Irgacure (registered trademark) 819 (bis(2,4,6-trimethylbenzoyl)-phenylphosphine oxide), Irgacure (registered trademark) 1800 (bis(2,6-dimethoxybenzoyl)-2,4,4-trimethyl-pentylphosphine oxide, 1-hydroxy-cyclohexyl-phenyl-ketone), Irgacure (registered trademark) 1800 (bis(2,6-dimethoxybenzoyl)-2,4,4-trimethyl-pentylphosphine oxide, 2-hydroxy-2-methyl-1-phenyl-1-propan-1-one), Irgacure (registered trademark) OXE01 (1,2-octanedione, 1-[4-(phenylthio)phenyl]-2-(O-benzoyloxime), Darocur (registered trademark) 1173 (2-hydroxy-2-methyl-1-phenyl-1-propan-1-one), Darocur (registered trademark) 1116, 1398, 1174, and 1020, and CGI242 (etanone, 1-[9-ethyl-6-(2-methylbenzoyl)-9H-carbazole-3-yl]-1-(O-acetyloxime)); Lucirin TPO (2,4,6-trimethylbenzoyldiphenylphosphine oxide) and Lucirin TPO-L (2,4,6-trimethylbenzoylphenylethoxyphosphine oxide) which are available from BASF; ESACURE 1001M ((1-[4-benzoylphenylsulfanyl]phenyl)-2-methyl-2-(4-methylphenylsulfonyl)propan-1-one) available from ESACUR Japan Siber Hegner K. K.; ADEKA OPTMER (registered trademark) N-1414 (carbazole/phenon), ADEKA Optomer (registered trademark) N-1717 (acridine), and ADEKA Optomer (registered trademark) N-1606 (triazine type), which are available from Asahi Denka Kogyo Co., Ltd.; TFE-Triazine (2-[2-(fran-2-yl)vinyl]-4,6-bis(trichloromethyl)-1,3,5-triazine) manufactured by Sanwa Chemical Co., Ltd., TME-Triazine (2-[2-(5-methylfuran-2-yl)vinyl]-4,6-bis(trichloromethyl)-1,3,5-triazine) manufactured by Sanwa Chemical Co., Ltd., and MP-Triazine (2-(4-methoxyphenyl)-4,6-bis(trichloromethyl)-1,3,5-triazine) manufactured by Sanwa Chemical Co., Ltd.; TAZ-113 (2-[2-(3,4-dimethoxyphenyl)ethenyl]-4,6-bis(trichloromethyl)-1,3,5-triazine) manufactured by Midori Chemical, and TAZ-108 (2-(3,4-dimethoxyphenyl)-4,6-bis(trichloromethyl)-1,3,5-triazine) manufactured by Midori Chemical; benzophenone, 4,4'-bisdiethylaminobenzophenone, methyl-2-benzophenone, 4-benzoyl-4'-methyldiphenylsulfide, 4-phenylbenzophenone, Michler's ethyl ketone, 2-chlorothioxanthone, 2-methylthioxanthone, 2-isopropylthioxanthone, 4-isopropylthioxanthone, 2,4-diethylthioxanthone, 1-chloro-4-propoxythioxanthone, 2-methylthioxanthone, thioxanthone ammonium salts, benzoin, 4,4'-dimethoxybenzoin, benzoin methyl ether, benzoin ethyl ether, benzoin isopropyl ether, benzoin isobutyl ether, benzyl dimethyl ketal, 1,1,1-trichloroacetophenone, diethoxyacetophenone and dibenzosverone, methyl o-benzoyl benzoate, 2-benzoylnaphthalene, 4-benzoylbiphenyl, 4-benzoyldiphenyl ether, 1,4-benzoylbenzene, benzyl, 10-butyl-2-chloroacrydone, [4-(methylphenylthio)phenyl]phenylmethane), 2-ethylanthraquinone, 2,2-bis(2-chlorophenyl)4,5,4',5'-tetrakis(3,4,5-trimethoxyphenyl)1,2'-biimidazole, 2,2-bis(o-chlorophenyl) 4,5,4',5'-tetraphenyl-1,2'-biimidazole, tris(4-dimethylaminophenyl)methane, ethyl-4-(dimethylamino) benzoate, 2-(dimethylamino)ethylbenzoate, butoxyethyl-4-(dimethylamino)benzoate, and the like.

—High Boiling Point Solvent—

The composition for forming a coating layer in the present disclosure preferably contains a high boiling point solvent, and more preferably contains a high boiling point solvent having a boiling point of 120° C. or higher.

In a case where the coating layer contains the high boiling point solvent, it is possible to obtain a coating layer in which leveling properties of a coated film that has been applied is improved, haze is low, and smoothness of a surface is high.

A boiling point of the high boiling point solvent is preferably 120° C. or higher, more preferably 140° C. or higher, and even more preferably 150° C. or higher, from the viewpoint that then it is possible to obtain a coating layer in which leveling properties of a coated film is further enhanced and haze is lower. An upper limit of the boiling point of the high boiling point solvent is preferably 230° C. from the viewpoint of inhibiting drying failure of a coated film formed by an application liquid for forming a coating layer.

Examples of high boiling point solvents include the followings. A numerical value in the parenthesis which is described in parallel with a name of a high boiling point solvent shown below indicates a boiling point.

Specific examples of high boiling point solvents include alcohol-based solvents such as 1,3-butanediol (207° C.), 1,4-butanediol (228° C.), benzyl alcohol (205° C.), and terpineol (217° C.); glycol-based solvents such as ethylene glycol (197° C.), diethylene glycol (244° C.), triethylene glycol (287° C.), propylene glycol (187° C.), and dipropylene glycol (230° C.); glycol ether-based solvents such as diethylene glycol monomethyl ether (194° C.), diethylene glycol monoethyl ether (202° C.), diethylene glycol monobutyl ether (231° C.), triethylene glycol monomethyl ether (249° C.), propylene glycol monomethyl ether (121° C.), propylene glycol monobutyl ether (170° C.), propylene glycol monopropyl ether (150° C.), 3-methoxy-3-methyl-1-butanol (174° C.), diethylene glycol monohexyl ether (261° C. or higher), propylene glycol monomethyl ether propionate (160° C.), methyl cellosolve (ethylene glycol monomethyl ether, 125° C.), ethyl cellosolve (ethylene glycol monoethyl ether, 135° C.), butyl cellosolve (ethylene glycol monobutyl ether, 171° C.), ethylene glycol-mono-tert-butyl ether (153° C.), tripropylene glycol monomethyl ether (243° C.), and dipropylene glycol monomethyl ether (188° C.); ether-based solvents such as diethylene glycol dimethyl ether (162° C.), diethylene glycol ethyl methyl ether (176° C.), diethylene glycol isopropyl methyl ether (179° C.), and triethylene glycol dimethyl ether (216° C.); eter-based solvents such as ethylene glycol monomethyl ether acetate (145° C.), diethylene glycol monoethyl ether acetate (217° C.), ethyl acetate (154° C.), ethyl lactate (154° C.), and 3-methoxybutyl acetate (172° C.); ketone-based solvents such as diacetone alcohol (169° C.), cyclohexanone (156° C.), and cyclopentanone (131° C.); and the like.

The alcohol-based solvent refers to a solvent having a structure in which one carbon atom of hydrocarbon is substituted with one hydroxy group. The glycol-based solvent means a solvent having a structure in which two or more carbon atoms of hydrocarbon are each substituted by one hydroxy group. The glycol ether-based solvent means a solvent having a structure having one hydroxy group and at least one ether group in one molecule. The ether-based solvent refers to a solvent having a structure that does not have a hydroxy group or an ester group in one molecule and has at least one ether group. The ester-based solvent means a solvent having a structure having at least one ester group in one molecule. The ketone-based solvent means a solvent having a structure having at least one ketone group in one molecule.

As the high boiling point solvent, a glycol ether-based solvent is preferably used because it has a low surface energy and enhances leveling properties of a coated film formed by the composition for forming a coating layer. In addition, because of the same reason as above, it is preferable to use a solvent having a branched alkyl group as the high boiling point solvent contained in the composition for forming a coating layer.

The composition for forming a coating layer may contain only one type of high boiling point solvent, or may contain two or more types thereof.

In a case where two or more high boiling point solvents are contained, it is preferable to include a glycol ether-based solvent as one of them. By containing the glycol ether-based solvent, flatness of a coated film formed by an application liquid for forming a coating layer is improved. A content of the glycol ether-based solvent is preferably in a range of 10 mass % to 50 mass %, and is more preferably in a range of 15 mass % to 40 mass %, in a total mass of the solvents.

In a case where two or more high boiling point solvents are contained, it is preferable to include a ketone-based solvent as one of them. By containing the ketone-based solvent, adhesiveness between the water absorbent film and the coating layer formed by the composition for forming a coating layer is improved. In a case where the ketone-based solvent is contained, a content of the ketone-based solvent is preferably in a range of 5 mass % to 40 mass %, and more preferably in a range of 5 mass % to 15 mass %, in a total mass of the solvents. In a case where the coating layer contains two or more high boiling point solvents, it is also preferable to include both a glycol ether-based solvent and a ketone-based solvent.

The ketone-based solvent as the high boiling point solvent is preferably a ketone-based solvent having an SP value (solubility parameter) of 10.0 MPa1/2 or more from the viewpoint that then, a coating layer having more excellent transparency can be formed. An upper limit of the SP value of the ketone-based solvent is not particularly limited, and it is preferably 13.0 MPa1/2 or less from the viewpoint of, for example, application properties onto a base material, for example, a case in which surface failure such as cissing is less likely to occur.

Specific examples of ketone-based solvent which has a high boiling point solvent and has an SP value of 10.0 MPa1/2 or more are shown below. However, the present disclosure is not limited to these examples. A numerical value in the parentheses described together with the specific example indicates an SP value (unit: MPa1/2).

Diacetone alcohol (10.2)
Cyclopentanone (10.4)

An SP value is a value represented by a square root of a molecular cohesive energy, and it is a value calculated by a method described in Polymer Engineering Science, 14, p. 147 to p. 154 (1974) by R. F. Fedors.

A content of the high boiling point solvent in the coating layer (or the composition for forming a coating layer) is preferably equal to or more than 15 mass % and equal to or less than 60 mass %, more preferably equal to or more than 20 mass % and equal to or less than 50 mass %, and even more preferably equal to or more than 20 mass % and equal to or less than 40 mass % with respect to a total mass of solid contents of the composition for forming a coating layer.

—Solvents Other than High Boiling Point Solvents—

The composition for forming a coating layer according to the present disclosure preferably contains water and a solvent other than the high boiling point solvent in addition to the above-described other additives.

Furthermore, the composition for forming a water absorbent film in the present disclosure preferably contains a solvent other than the high boiling point solvent in addition to the above-mentioned other additives.

(Water)

Water contributes as a dispersion medium for the inorganic oxide particles in the composition for forming a coating layer.

A water content of the composition for forming a coating layer is preferably in a range of 5 mass % to 60 mass %, more preferably in a range of 10 mass % to 55 mass %, and even more preferably in a range of 10 mass % to 35 mass % with respect to a total mass of the composition for forming a coating layer.

(Organic Solvent Having a Boiling Point of Less than 120° C.)

The composition for forming a coating layer in the present disclosure preferably contains an organic solvent having a boiling point of less than 120° C.

Examples of organic solvents having a boiling point of less than 120° C. include alcohol-based solvents such as methanol, ethanol, butanol, 2-methyl-1-butanol, 2-methyl-2-butanol, n-propanol, 2-propanol, tert-butanol, and 2-butanol;

glycol ether-based solvents such as dipropylene glycol methyl ether;

ether-based solvents such as isopropyl ether, 1,4-dioxane, tert-butyl methyl ether, tetrahydrofuran, 2-methyltetrahydrofuran, 1,2-dimethoxyethane, and diethyl ether;

ketone-based solvents such as acetone, acetylacetone, methyl ethyl ketone, methyl isobutyl ketone, and diisobutyl ketone; and the like.

As the organic solvent having a boiling point of lower than 120° C., an alcohol-based solvent is preferable from the viewpoint of low surface energy and enhancing spreadability of the composition for forming a coating layer.

With respect to the composition for forming a coating layer in the present disclosure, only one kind of organic solvents having a boiling point of less than 120° C. may be used, or two or more kinds thereof may be used.

In a case where two or more kinds of organic solvents having a boiling point of less than 120° C. are used, by using a ketone-based solvent as one kind thereof, adhesiveness between the water absorbent film and the coating layer formed by an application liquid for forming a coating layer may be improved. As the ketone-based solvent used herein, acetone (10.0) and acetylacetone (10.3) having an SP value of 10.0 MPa1/2 or more are preferable. The numerical value in parentheses is an SP value.

Regardless of the boiling point, the ketone-based solvent is preferably used in a range of 1 mass % to 15 mass % and is more preferably used in a range of 3 mass % to 10 mass % in a total mass of the solvents.

In a case where the composition for forming a coating layer according to the present disclosure contains an organic solvent having a boiling point of less than 120° C., a content of the organic solvent having a boiling point of less than 120° C. is preferably in a range of 20 mass % to 70 mass %, and is more preferably in a range of 25% to 65 mass % with respect to a total mass of the application liquid for forming a coating layer.

—Antistatic Agent—

The composition for forming a coating layer of the present embodiment preferably contains at least one kind of antistatic agent.

By incorporating the antistatic agent, the obtained coating layer is provided with antistatic properties, an effect of preventing adherence of contaminated substances is improved, and antifouling properties are further improved.

The antistatic agent can be appropriately selected from compounds having an antistatic function, and it may be any of a compound showing surface activity or a compound not showing surface activity. Examples of antistatic agents include ionic surfactants, metal oxide particles, and the like. The above-mentioned inorganic oxide particles are not included in the metal oxide particles as the antistatic agent.

For example, in a case where the composition for forming a coating layer is applied to a base material to form a coating layer, the ionic surfactant as an antistatic agent has a property of easily segregating near a film surface of a coated film, and an effect can be expected by adding a small amount thereof.

Furthermore, the metal oxide particles as the antistatic agent may be required to be added in a relatively large amount in order to impart antistatic properties to the coating layer, but because they are inorganic substances, they are suitable for enhancing scratch resistance of the coating layer.

Examples of other ionic surfactants include anionic surfactants such as alkyl sulfate (for example, sodium dodecyl sulfate, sodium lauryl sulfate, and the like), alkylbenzene sulfonate (for example, sodium dodecylbenzene sulfonate, sodium laurylbenzene sulfonate, and the like), alkyl sulfosuccinate (for example, di(2-ethylhexyl) sodium sulfosuccinate and the like), and alkyl phosphates (for example, sodium dodecyl phosphate and the like); cationic surfactants such as alkyltrimethylammonium salts and dialkyldimethylammonium salts; and amphoteric surfactants such as alkylcarboxybetaine.

In a case where another ionic surfactant is used as the antistatic agent, a content of the other ionic surfactant is preferably 10 mass % or less, is more preferably 5 mass %, and is even more preferably 1 mass % or less with respect to a total solid content of the composition for forming a coating layer. By setting the content of the other ionic surfactant within the above-mentioned range, antifouling properties of the coating layer can be enhanced while still suppressing aggregation of inorganic oxide particles. Furthermore, a content of the other ionic surfactant is preferably 0.05 mass % or more from the viewpoint of an effect of improving antifouling properties of the coating layer by incorporating the ionic surfactant.

—Surfactant—

The composition for forming a coating layer in the present embodiment may further contain a surfactant. By incorporating the surfactant in the coating layer, an ability to prevent adherence of contaminated substances is further improved.

As the surfactant, an antistatic agent and a surfactant may be used in combination regardless of whether or not the antistatic agent has surface activity. In a case where the antistatic agent is a compound not showing surface activity, it is preferable to incorporate a surfactant from the viewpoint of water washability. In a case where the antistatic agent is a compound showing surface activity, it is preferable to incorporate a surfactant in addition to the antistatic agent from the viewpoint of further improving antifouling properties.

In a case where the composition for forming a coating layer contains a surfactant, not only antifouling properties of the coating layer can be enhanced but also application properties in a case of forming the coating layer by, for example, application can be enhanced, and a surface tension of an application liquid used for application is also reduced, and thereby uniformity of a coated film is further improved.

Examples of surfactants include nonionic surfactants and the like.

In a case where an ionic surfactant is used as the above-mentioned antistatic agent, and in a case where the ionic surfactant is added to a film in an excessive amount as described above, because electrolytic mass in the system increases and aggregation of inorganic oxide particles is likely to occur, it is preferable to use a nonionic surfactant in combination. However, the nonionic surfactant does not necessarily have to be used in combination with the ionic surfactant, and the nonionic surfactant may be contained alone as the surfactant.

Examples of nonionic surfactants include polyalkylene glycol monoalkyl ether, polyalkylene glycol monoalkyl ester, polyalkylene glycol monoalkyl ester/monoalkyl ether, and the like. Specific examples of nonionic surfactants include polyethylene glycol monolauryl ether, polyethylene glycol monostearyl ether, polyethylene glycol monocetyl ether, polyethylene glycol monolauryl ester, polyethylene glycol monostearyl ester, and the like.

In a case where the surfactant is contained in the composition for forming a coating layer, a content thereof is preferably 0.5 mass % or more, and more preferably 1.0 mass % or more, with respect to a total solid content of the composition for forming a coating layer.

In addition, a content of the surfactant is preferably 50.0 mass % or less, more preferably 40.0 mass % or less, and even more preferably 30.0 mass % or less with respect to a total solid content of the composition for forming a coating layer.

<Film Thickness of Coating Layer>

A thickness of the coating layer constituting the antifogging laminate may be appropriately selected according to usage applications or purposes, and it is preferably within a range of several hundreds nm to 10 μm, is more preferably 1 μm to 10 μm, and is even more preferably 1 μm to 6 μm. By setting the thickness of the coating layer within the above-mentioned range, the antifogging laminate has excellent crack resistance while still ensuring transparency.

<Non-Water Absorbent Support>

A non-water absorbent support is preferably disposed on a water absorbent film side opposite to a water absorbent film side having the coating layer. In a case where the antifogging laminate includes a pressure sensitive adhesive layer, an aspect having a non-water absorbent support between the water absorbent film and the pressure sensitive adhesive layer is preferable.

A material of the non-water absorbent support can be appropriately selected from various materials such as glass, resins (including plastics), metals, and ceramics, and it is preferably a resin.

In a case where the antifogging laminate of the present disclosure is applied to, for example, protective materials for automobile lights or protective materials for surveillance cameras, it is preferable to use a resin base material in terms of light weight and excellent strength.

In a case where a material of the non-water absorbent support is a resin, a non-water absorbent support is preferably a support formed of an acrylic resin, polycarbonate, polyolefin, or polyethylene terephthalate from the viewpoint that then, it is possible to form a laminate having excellent durability against light and heat, and having excellent adhesiveness while still maintaining transparency of the support itself between the coating layer; and a non-water absorbent support is more preferably a support formed of an acrylic resin or polycarbonate, and is even more preferably a support formed of polycarbonate or polymethylmethacrylate, from the viewpoint that then, it is possible to form a laminate having further excellent adhesiveness.

As a material of the non-water absorbent support, a composite material formed from a plurality of materials may be used. For example, a material of the non-water absorbent support includes glass and a resin material, and it may be a composite material in which glass and a resin material are mixed and composited, a resin composite material in which a plurality of kinds of resin materials are kneaded or bonded, and the like.

A thickness and a shape of the non-water absorbent support are not particularly limited, and they can be appropriately selected depending on application targets. A thickness of the non-water absorbent support can be set to several tens μm to several hundreds μm.

Furthermore, a surface of a base material may be subjected to a surface treatment, as necessary. A surface treatment method is not particularly limited, and known methods such as a corona discharge treatment can be used.

<Pressure Sensitive Adhesive Layer>

The antifogging laminate of the present disclosure can have a laminate structure in which a pressure sensitive adhesive layer is attached on a side opposite to a side having the coating layer, depending on usage applications or purposes. The pressure sensitive adhesive layer is preferably provided as an outermost layer on the side opposite to the side having the coating layer, and in a case where the non-water absorbent support is provided on the side opposite to the side having the coating layer, it is preferable that the pressure sensitive adhesive layer be further provided on the non-water absorbent support on the coating layer.

By attaching the pressure sensitive adhesive layer, the antifogging laminate can be placed at a desired position.

A pressure sensitive adhesive forming the pressure sensitive adhesive layer is not particularly limited, and it may be appropriately selected depending on purposes. Examples thereof include a polyvinyl butyral (PVB) resin, an acrylic resin, a styrene/acrylic resin, a urethane resin, a polyester resin, a silicone resin, and the like. One kind of these resins may be used alone or a combination of two or more kinds thereof may be used. The pressure sensitive adhesive layer made of these materials can be formed by application. Furthermore, an antistatic agent, a lubricant, an antiblocking agent, or the like may be added to the pressure sensitive adhesive layer. Examples of pressure sensitive adhesive layers include PANACLEAN PD-S1 manufactured by PANAC Co., Ltd., and the like.

A thickness of the pressure sensitive adhesive layer is preferably several tens of μm and is more preferably 10 μm to 50 μm.

<Method for Manufacturing Antifogging Laminate>

A method for manufacturing an antifogging laminate of the present disclosure is preferably an aspect including a step of applying a coating liquid containing a water absorbent resin and inorganic oxide particles and drying the coating liquid, for example, a step of applying a coating liquid (application liquid for forming a coating layer) onto a water absorbent film; and a step of drying the coated film formed by the application.

[Application Step]

In the application step, the application liquid for forming a coating layer is applied onto the water absorbent film which is a material to be coated. The water absorbent film is as described above.

An application method may be determined according to a shape and a size of the water absorbent film, a thickness of the coated film, and the like. For example, it is possible to apply well-known application methods such as spray coating, brush coating, roller coating, bar coating, dip coating (so-called, immersion coating), spin coating, slit coating, and slit and spin coating.

Among them, bar coating is preferable as the application method from the viewpoint of film thickness uniformity.

In a case where the application liquid is applied onto the water absorbent film by spray coating, a method of setting the water absorbent film is not particularly limited.

Depending on a shape of the water absorbent film, application can be performed while appropriately changing an orientation of the water absorbent film in a horizontal direction, a vertical direction, and the like with respect to an application direction. In order to make a thickness of an application layer more uniform, it is preferable to dispose a spray nozzle at a position where a distance between the spray nozzle and the water absorbent film is equidistant and apply the application liquid onto the water absorbent film, or it is preferable that a distance between the spray nozzle and the water absorbent film be equal to or more than 10 mm and equal to or less than 1,000 mm.

As a method of supplying the application liquid to an application device, any of a pressure feeding type, a suction type, or a gravity type can be used. A nozzle diameter of the spray nozzle is preferably equal to or more than 0.1 mmφ and equal to or less than 1.8 mmφ, and an air pressure is preferably equal to or more than 0.02 MPa and equal to or less than 0.60 MPa. By performing the application under such conditions, a thickness of the application layer can be made more uniform. In order to form a more suitable application layer by spray coating, it is necessary to adjust an amount of air, an amount of the application liquid jetted, a pattern opening, and the like.

In a case where the application liquid is applied to the water absorbent film by spray coating, an air amount is preferably equal to or more than 5 L (liter)/min and equal to or less than 600 L/min, an amount of the application liquid jetted is preferably equal to or more than 5 L/min and equal to or less than 600 L/min, and a pattern opening is preferably equal to or more than 40 mm and equal to or less than 450 mm.

In spray coating, an environment for the application also affects formation of a coated film. A temperature condition is preferably equal to or higher than 15° C. and equal to or lower than 35° C., and a humidity condition is preferably equal to or less than 80% RH.

Cleanliness is not particularly limited, but for example, from the viewpoint of inhibiting surface failure due to fine particles (that is, particles) in an application environment, cleanliness of class is preferably 10,000 or more, and cleanliness of class is more preferably 1,000 or more.

An application amount of the application liquid is not particularly limited, and it can be appropriately set in consideration of operability and the like according to a concentration of solid contents in the application liquid, a desired layer thickness of a coating layer, and the like. For example, an application amount of the application liquid is preferably equal to or more than 1 mL/m$^2$ and equal to or less than 400 mL/m$^2$, more preferably equal to or more than 2 mL/m$^2$ and equal to or less than 100 mL/m$^2$, even more preferably equal to or more than 4 mL/m$^2$ and equal to or less than 40 mL/m$^2$, and particularly preferably equal to or more than 6 mL/m$^2$ and equal to or less than 20 mL/m$^2$. By setting the application amount within the above-mentioned range, application accuracy is favorable.

[Drying Step]

In the drying step, the application liquid applied onto the water absorbent film is dried.

The application liquid may be dried using a heating device.

The heating device is not particularly limited as long as a temperature can be heated to a target temperature therewith, and any known heating device can be used. As the heating device, in addition to an oven, an electric furnace, and the like, it is possible to use a heating device that is uniquely produced according to the manufacturing line.

Drying conditions of the application liquid are not particularly limited, and they can be appropriately set in consideration of curing properties of an application layer.

Drying of the application liquid may be performed under constant temperature conditions in which a predetermined temperature is kept constant, or temperature conditions may be changed stepwise.

As drying conditions of the application liquid in the former case, drying conditions in which the application liquid is dried by heating at a surface temperature of equal to or higher than 20° C. and equal to or lower than 150° C. for 1 to 60 minutes are preferable, drying conditions in which the application liquid is dried by heating at a surface temperature of equal to or higher than 40° C. and equal to or lower than 150° C. for 1 to 60 minutes are more preferable, and drying conditions in which the application liquid is dried by heating at a surface temperature of equal to or higher than 60° C. and equal to or lower than 150° C. for 1 to 60 minutes are even more preferable.

In the latter case, it is preferable that drying of the application liquid be divided into preliminary drying and main drying. Conditions for the preliminary drying are preferably conditions in which heating is performed at a surface temperature of equal to or higher than 20° C. and equal to or lower than 60° C. for 5 seconds to 10 minutes.

A surface temperature can be measured with an infrared thermometer or the like.

In a case where the application liquid is dried by blowing dry air, an air volume of the dry air can be appropriately set in consideration of an optimum temperature in a case where the dry air reaches a water absorbent resin layer. However, in consideration of drying unevenness, it is preferable to suppress the air volume as much as possible, and it is more preferable to perform drying under conditions in which dry air is not directly applied to the water absorbent resin layer.

The water absorbent resin layer to which the application liquid is applied may be placed directly on a pedestal (that is, placed flat) and dried depending on a shape of the water absorbent film, or may be leaned and dried, but it also may be hung and dried.

As described above, the coating layer is formed on the water absorbent film, and thereby the antifogging laminate of the present disclosure can be produced.

EXAMPLES

Hereinafter, the embodiments of the present invention will be specifically described with reference to examples, but the present invention is not limited to the following examples unless the gist thereof is exceeded.

—Preparation of Application Liquid for Forming Coating Layer—

(Application Liquid 1)

A coating agent (application liquid for forming a coating layer) was prepared by mixing the following components. The obtained coating agent was used for an application liquid 1 of Examples 1 and 5.

SNOWTEX (registered trademark) O33 (aqueous dispersion liquid of spherical silica particles having a primary particle size of 10 to 15 nm, solid content 33%, Nissan Chemical Industries, Ltd.): 9 parts by mass GOHSENX (registered trademark) Z-220 (polyvinyl alcohol resin): 2 parts by mass Ion exchange water: 89 parts by mass (Application Liquid 2)

A coating agent was prepared by mixing the following components. The obtained coating agent was used for an application liquid 2 of Example 2.

Alumisol 10A (aqueous dispersion liquid of alumina particles having a particle size (minor axis×major axis) of 10×50 nm, solid content 10%, Kawaken Fine Chemicals Co., Ltd.): 30 parts by mass GOHSENX (registered trademark) Z-220 (polyvinyl alcohol resin): 2 parts by mass Ion exchange water: 68 parts by mass (Application Liquid 3)

A coating agent was prepared by mixing the following components. The obtained coating agent was used for an application liquid 3 of Example 3.

Alumisol-F3000 (aqueous dispersion liquid of alumina particles having a particle size (minor axis×major axis) of 4×3,000 nm, solid content 5%, Kawaken Fine Chemicals Co., Ltd.): 60 parts by mass GOHSENX (registered trademark) Z-220 (polyvinyl alcohol resin): 2 parts by mass Ion exchange water: 38 parts by mass (Application Liquid 4)

A coating agent was prepared by mixing the following components. The obtained coating agent was used for an application liquid 4 of Example 4.

Alumisol-F3000 (aqueous dispersion liquid of alumina particles having a particle size (minor axis×major axis) of 4×3,000 nm, solid content 5%, Kawaken Fine Chemicals Co., Ltd.): 36 parts by mass Alumisol 10A (aqueous dispersion liquid of alumina particles having a particle size (minor axis×major axis) of 10×50 nm, solid content 10%, Kawaken Fine Chemicals Co., Ltd.): 12 parts by mass GOHSENX (registered trademark) Z-220 (polyvinyl alcohol resin): 2 parts by mass Ion exchange water: 50 parts by mass (Application Liquid 5)

A coating agent was prepared by mixing the following components. The obtained coating agent was used for an application liquid 5 of Example 6.

SNOWTEX (registered trademark) O33 (aqueous dispersion liquid of spherical silica particles having a primary particle size of 10 to 15 nm, solid content 33%, Nissan Chemical Industries, Ltd.): 9 parts by mass GOHSENX (registered trademark) Z-220 (polyvinyl alcohol resin): 1.8 parts by mass NIKALAC (registered trademark) MX-035 (diluted solution of methylolated melamine compound with water, solid content 70%, Sanwa Chemical Co., Ltd.): 0.3 parts by mass Diluted solution of p-toluenesulfonic acid with water, solid content 10%: 0.2 parts by mass Ion exchange water: 38.7 parts by mass Ethanol: 50 parts by mass —Production of Antifogging Laminate—

Example 1

By a spray coating method, the application liquid 1 was applied onto a saponification-treated triacetyl cellulose (saponified TAC, manufactured by TOCHISEN, thickness: 127 μm, thickness of saponification-treated layer: 7 to 8 μm, water absorption rate: 15%; water absorbent resin layer), which was a water absorbent resin film, such that a dry thickness was 6 μm, and the coated film was dried at 150° C. for 10 minutes to form a coating layer.

In the above manner, an antifogging laminate of Example 1 having a laminate structure of coating layer/saponification-treated TAC (saponified TAC) was produced as an antifogging material.

Example 2

An antifogging laminate of Example 2 was obtained in the same manner as in Example 1 except that the application liquid 1 in Example 1 was changed to the application liquid 2.

Example 3

An antifogging laminate of Example 3 was obtained in the same manner as in Example 1 except that the application liquid 1 in Example 1 was changed to the application liquid 3.

Example 4

An antifogging laminate of Example 4 was obtained in the same manner as in Example 1 except that the application liquid 1 in Example 1 was changed to the application liquid 4.

Example 5

By a spray coating method, the application liquid 1 was applied onto a saponification-treated triacetyl cellulose (saponified TAC, manufactured by TOCHISEN, thickness: 127 µm, thickness of saponification-treated layer: 0.5 µm, water absorption rate: 5%; water absorbent resin layer), which was a water absorbent resin film, such that a dry thickness was 6 µm, and the coated film was dried at 150° C. for 10 minutes to form a coating layer.

In the above manner, an antifogging laminate of Example 5 having a laminate structure of coating layer/saponification-treated TAC (saponified TAC) was produced as an antifogging material.

Example 6

An antifogging laminate of Example 6 was obtained in the same manner as in Example 1 except that the application liquid 1 in Example 1 was changed to the application liquid 5.

Example 7

By a spray coating method, the application liquid 1 was applied onto a triacetyl cellulose (TAC, manufactured by TOCHISEN, thickness: 127 µm, no saponification treatment, water absorption rate: 1%; water absorbent resin layer), which was a water absorbent resin film, such that a dry thickness was 6 µm, and the coated film was dried at 150° C. for 10 minutes to form a coating layer.

In the above manner, an antifogging laminate of Example 7 having a laminate structure of coating layer/TAC was produced as an antifogging material.

Example 8

An antifogging laminate of Example 8 having a laminate structure of coating layer/saponification-treated TAC (saponified TAC) was produced as an antifogging material in the same manner as in Example 3 except that the application liquid 3 was applied by a spray coating method such that a dry thickness was 0.5 µm in Example 3.

Comparative Example 1

An antifogging laminate of Comparative Example 1 was produced by performing the same operation as in Example 1 except that the application liquid 1 was not applied, and a single film of a saponification-treated triacetyl cellulose (saponified TAC; manufactured by TOCHISEN, thickness: 127 µm, thickness of saponification-treated layer: 7 to 8 µm, water absorption rate: 15%) was used as an antifogging material in Example 1.

Comparative Example 2

An antifogging laminate of Comparative Example 2 having a laminate structure of coating layer/polycarbonate was produced as an antifogging material in the same manner as in Example 1 except that saponification-treated triacetyl cellulose (saponified TAC) was replaced by polycarbonate (manufactured by Kuraray Co., Ltd., CARBOGLASS C110, thickness: 100 µm, water absorption rate: 0.2%), which was a non-water absorbent film, in Example 1.

—Measurement of Film Thickness of Coating Layer—

A film thickness of the coating layer and/or the water absorbent film was measured by cutting the formed antifogging laminate with a microtome in a direction perpendicular to a base material surface in the laminate, that is, in a thickness direction of the laminate to obtain a cross section of the laminate, and observing the cut cross section at a magnification of 50,000 times with a field emission scanning electron microscope (FE-SEM).

In the observation, a thickness of the layer in which particles were observed in the antifogging laminate was defined as a thickness of the coating layer, and a thickness of the layer in which particles were not observed was defined as a thickness of the water absorbent film.

<Evaluation>

The following evaluation was performed on the antifogging materials produced above. Evaluation results are shown in Table 1.

—Initial Antifogging Properties—

A hot-water bath at 40° C. was prepared, steam from the hot-water bath was applied only to a predetermined 5 cm×5 cm region of the coating layer of the obtained laminate, and a dulling state in a case where steam was applied for 10 seconds was visually observed. In the evaluation, a standard "3" was regarded as a pass.

<Evaluation Standard>

3: There was no dulling, and there was no fluctuation in which a transmission image was shown as it was blurred.

2: There was no dulling, but there was fluctuation in which a transmission image was shown as it was blurred.

1: Dulling occurred, and a transmission image could not be seen.

—Long-Term Antifogging Properties—

A hot-water bath at 40° C. was prepared, steam from the hot-water bath was applied only to a predetermined 5 cm×5 cm region of the coating layer of the obtained laminate, and a time until dulling occurred was measured. In the evaluation, a standard "2" and a higher standard were regarded as a pass.

<Evaluation Standard>

3: There was no dulling for 5 minutes or longer, and there was no fluctuation in which a transmission image was shown as it was blurred.

2: There was no dulling for 1 minute or longer and less than 5 minutes, and there was no fluctuation in which a transmission image was shown as it was blurred.

1: Dulling occurred in less than 1 minute, and a transmission image could not be seen.

—Scratch Resistance—

A sample with a size of 10 cm×10 cm was prepared as an antifogging material, a surface having an antifogging laminate was subjected to a pencil hardness test under conditions of JIS K 5600 5-4 (1999), and a case in which a pencil hardness was H or more was regarded as a pass.

—Dripping Marks (Dried Marks) on Dried Surface after Forming Water Film—

A sample with a size of 10 cm×10 cm was prepared as an antifogging material, and 10 ml of water was sprayed onto a surface having an antifogging laminate to forcibly form a water film. Thereafter, the sample was left standing in a state of being hung vertically to be dried. In the evaluation, a standard "2" and a higher standard were regarded as a pass.

<Evaluation Standard>
3: No dripping marks were observed.
2: Dripping marks were slightly visible.
1: Dripping marks were clearly visible.

ties to, for example, protective materials (so-called protective cover) for protecting surveillance cameras, lighting, sensor lamps, and the like; roofing materials for garages for vehicles such as automobiles and motorcycles; signs such as road signs; soundproof walls for highway shoulder installation, railways, and the like; bodies of vehicles such as automobiles and motorcycles; protective materials (for example, lenses) for window glass, mirrors, and lights of automobiles; and the like.

Among them, it is more suitable for usage applications such as protective materials for lights of automobiles (headlights, tail lamps, door mirror winker lights, and the like) and protective materials for surveillance cameras.

TABLE 1

|  | Configuration of layer | | Antifogging properties | | Scratch resistance (pencil hardness) | Dried marks |
|---|---|---|---|---|---|---|
|  | Coating layer | Support | Initial stage | Long term |  |  |
| Example 1 | Application liquid 1 (6 μm) | Saponified TAC (water absorption rate: 15%) | 3 | 3 | H | 3 |
| Example 2 | Application liquid 2 (6 μm) | Saponified TAC (water absorption rate: 15%) | 3 | 3 | H | 3 |
| Example 3 | Application liquid 3 (6 μm) | Saponified TAC (water absorption rate: 15%) | 3 | 3 | 2H | 3 |
| Example 4 | Application liquid 4 (6 μm) | Saponified TAC (water absorption rate: 15%) | 3 | 3 | 2H | 3 |
| Example 5 | Application liquid 1 (6 μm) | Saponified TAC (water absorption rate: 5%) | 3 | 2 | H | 3 |
| Example 6 | Application liquid 5 (6 μm) | Saponified TAC (water absorption rate: 15%) | 3 | 3 | 2H | 3 |
| Example 7 | Application liquid 1 (6 μm) | TAC (water absorption rate: 1%) | 3 | 2 | H | 3 |
| Example 8 | Application liquid 3 (0.5 μm) | Saponified TAC (water absorption rate: 15%) | 3 | 3 | H | 3 |
| Comparative Example 1 | Not used | Saponified TAC (water absorption rate: 15%) | 3 | 3 | Less than H | 1 |
| Comparative Example 2 | Application liquid 1 (6 μm) | Polycarbonate (water absorption rate: 0.2%) | 1 | 1 | H | 3 |

As shown in Table 1, the antifogging laminate layers obtained in the examples could maintain a favorable antifogging performance for a long period of time, had excellent scratch resistance, and was dripping-mark-suppressive after being dried.

On the other hand, in Comparative Example 1, although antifogging properties were obtained due to the material constitution of only the water absorbent film not having a coating layer thereon, it was inferior in scratch resistance, and generation of dripping marks after being dried was also noticeable.

Furthermore, in Comparative Example 2, antifogging properties could not be obtained both in the initial stage and in the long term because the material constitution in which there was only the coating layer and a water absorbent film was not provided.

The antifogging laminate of the present disclosure can be used in various usage applications, and it is preferably used in terms of imparting functions such as antifogging proper- Generally, an automobile includes a light unit composed of a light and a lens for protecting the light. In a transparent base material such as glass and plastic used for the light unit, moisture in the atmosphere adheres to a surface of the base material as water droplets, and the surface tends to condense in a case where one surface is below a dew point due to a difference in temperature and humidity between an inner surface and an outer surface with a base material therebetween, or in a case where a sudden change in temperature and humidity occurs with respect to a base material (in a case where boiling steam comes into contact with a base material, in a case where an environment moves from a low temperature part to a hot and humid environment, and the like). As a result, so-called "dulling" in which light is scattered by condensed water droplets may occur. In a case where such "dulling" occurs in headlights, rear lights, and the like, appearance is significantly impaired. Dulling easily occurs even in a protective cover of a surveillance camera having the protective cover (that is, a surveillance camera integrated with a housing), and therefore visibility and safety may be significantly impaired.

From the above-mentioned viewpoints, the antifogging laminate of the present disclosure does not impair appearance, a function, and a performance of automobile lights and surveillance cameras, has excellent antifogging properties and contamination resistance, and can be used for a long period of time while still maintaining antifogging properties.

EXPLANATION OF REFERENCES

10: antifogging laminate
12: coating layer
14: water absorbent film
16: pressure sensitive adhesive layer
18: non-water absorbent support
20: pressure sensitive adhesive layer

What is claimed is:

1. An antifogging laminate comprising:
a water absorbent film, and
a coating layer on the water absorbent film,
wherein the coating layer contains a water absorbent resin and inorganic oxide particles,
the water absorbent resin is a polyvinyl alcohol-based resin,
the inorganic oxide particles are particles having an average aspect ratio of 30 to 1,000,
a water absorption rate of the water absorbent film is 1% or more and 50% or less, and
the water absorption rate is measured according to Japanese Industrial Standards (JIS) K 7209:2000 (A method), wherein the inorganic oxide particles are alumina particles.

2. The antifogging laminate according to claim 1, wherein the water absorbent film contains at least one resin selected from the group consisting of a cellulose-based resin, a polyvinyl alcohol-based resin, a polyvinyl acetal-based resin, a polyvinylpyrrolidone-based resin, a polyvinyl acetate-based resin, a polyvinyl acetamide-based resin, and a polyacrylamide-based resin.

3. The antifogging laminate according to claim 1, wherein the water absorbent film contains a cellulose-based resin or a polyvinyl alcohol-based resin.

4. The antifogging laminate according to claim 1, wherein the water absorbent film is a triacetyl cellulose film.

5. The antifogging laminate according to claim 1, wherein the water absorbent film is a triacetyl cellulose film subjected to a hydrophilization treatment.

6. The antifogging laminate according to claim 1, wherein the inorganic oxide particles further comprise silica particles.

7. The antifogging laminate according to claim 1, wherein a thickness of the coating layer is 1 μm to 10 μm.

8. The antifogging laminate according to claim 1, further comprising a support layer on a water absorbent film side opposite to a water absorbent film side having the coating layer.

9. The antifogging laminate according to claim 8, further comprising a pressure sensitive adhesive layer on a support layer side opposite to a support layer side having the water absorbent film.

10. The antifogging laminate according to claim 1, further comprising a pressure sensitive adhesive layer on a water absorbent film side opposite to a water absorbent film side having the coating layer.

11. The antifogging laminate according to claim 1, wherein the water absorbent film is a triacetyl cellulose film having a saponification-treated layer, and
a thickness of the saponification-treated layer is equal to or more than 5 μm.

12. A method for manufacturing an antifogging laminate, the method comprising:
applying a coating liquid containing a water absorbent resin and inorganic oxide particles onto a water absorbent film, and
drying the coating liquid,
wherein the water absorbent resin is a polyvinyl alcohol-based resin, and
the inorganic oxide particles are particles having an average aspect ratio of 30 to 1,000, wherein the inorganic oxide particles are alumina particles.

13. The method for manufacturing an antifogging laminate according to claim 12, wherein the inorganic oxide particles further comprise silica particles.

14. The method for manufacturing an antifogging laminate according to claim 12, wherein the coating liquid contains a crosslinking agent.

15. The method for manufacturing an antifogging laminate according to claim 12, wherein the coating liquid contains a curing catalyst.

16. The method for manufacturing an antifogging laminate according to claim 12, wherein the water absorbent film is a triacetyl cellulose film having a saponification-treated layer, and
a thickness of the saponification-treated layer is equal to or more than 5 μm.

* * * * *